United States Patent [19]
Alspach et al.

[11] Patent Number: 5,575,389
[45] Date of Patent: Nov. 19, 1996

[54] TWIN SHEET PLASTIC PALLET WITH LATCH MEANS

[75] Inventors: James C. Alspach, Farmington Hills; Steven R. Spooner, Ann Arbor; Kurtis A. Nofz, Belleville, all of Mich.

[73] Assignee: Johnstown Industries, Inc., Plymouth, Mich.

[21] Appl. No.: 381,217

[22] Filed: Jan. 31, 1995

Related U.S. Application Data

[63] Continuation-in-part of Ser. No. 319,996, Oct. 7, 1994, Pat. No. 5,529,185.

[51] Int. Cl.$^6$ .................................................. B65D 19/44
[52] U.S. Cl. ..................... 206/386; 108/55.5; 206/335; 206/600
[58] Field of Search ..................... 206/386, 597, 206/600, 335; 108/55.3, 55.5, 901

[56] References Cited

U.S. PATENT DOCUMENTS

| | | |
|---|---|---|
| D. 336,715 | 6/1993 | Gora et al. . |
| 3,187,691 | 6/1965 | Leitzel . |
| 3,315,800 | 4/1967 | Wagner ..................................... 206/597 |
| 3,348,756 | 10/1967 | Boysen . |
| 3,526,000 | 8/1970 | Williams . |
| 3,583,036 | 6/1971 | Brown . |
| 3,610,172 | 10/1971 | Wharton . |
| 3,610,173 | 10/1971 | McIlwraith et al. . |
| 3,702,100 | 11/1972 | Wharton . |
| 3,753,407 | 8/1973 | Tilseth ................................. 108/55.3 X |
| 3,787,158 | 1/1974 | Brown et al. . |
| 3,832,955 | 9/1974 | Pottinger et al. . |
| 3,925,140 | 12/1975 | Brown . |
| 4,161,261 | 7/1979 | Frater . |
| 4,254,873 | 3/1981 | Cook, III et al. . |
| 4,372,444 | 2/1983 | LeGrand et al. . |
| 4,394,096 | 7/1983 | Stevens . |
| 4,413,737 | 11/1983 | Wind . |
| 4,425,852 | 1/1984 | Riviere . |
| 4,428,306 | 1/1984 | Dresen et al. . |
| 4,529,092 | 7/1985 | Swingley, Jr. . |
| 4,550,830 | 11/1985 | Shuert . |
| 4,588,087 | 5/1986 | Swingley, Jr. . |
| 4,606,278 | 8/1986 | Shuert . |
| 4,742,781 | 5/1988 | Shuert ................................. 206/600 X |
| 4,765,252 | 8/1988 | Shuert . |
| 4,796,540 | 1/1989 | Pelfrey ................................... 108/55.3 |
| 4,799,433 | 1/1989 | Luft . |
| 4,847,974 | 7/1989 | Pelfrey . |
| 4,856,657 | 8/1989 | Shuert . |
| 4,879,956 | 11/1989 | Shuert . |
| 4,936,451 | 6/1990 | Shuert . |
| 5,011,011 | 4/1991 | Kidd ................................. 206/386 X |

(List continued on next page.)

*Primary Examiner*—Bryon P. Gehman
*Attorney, Agent, or Firm*—Barnes, Kisselle, Raisch, Choate, Whittemore & Hulbert

[57] ABSTRACT

A low-profile, flat twin sheet thermoformed pallet adapted to carry and store relatively, heavy, bulky manufactured components having a high load profile relative to the low flat pallet profile. The disclosed pallet exemplary embodiment is particularly constructed for shipping and storing automotive vehicle passenger seats. The disclosed embodiment is a vehicle standardized pallet having cooperative seat load nesting compartments and a permanent on-board seat belt latching system capable of removable receiving and securely attaching, with the same extendable belt latch operating procedure, any one of the various different types of vehicle seat constructions, in pallet load groups of one or more, with the seats resting on their feet, and occupying predetermined positions in a given orientation thereon corresponding to their desired vehicle assembly orientation and sequence in use. The pallet thus provides, in a grouping of pallets, a vehicle seat shipping package bar-code identifiable in advance for shipment from the seat manufacturer to the vehicle final assembly plant under just-in-time inventory supply system conditions so as to automatically deliver to the appropriate assembly line station the correct selection of seating components for a given vehicle option in a rapid, reliable, automated and economical manner.

21 Claims, 8 Drawing Sheets

U.S. PATENT DOCUMENTS

| | | |
|---|---|---|
| 5,042,396 | 8/1991 | Shuert . |
| 5,046,434 | 9/1991 | Breezer et al. . |
| 5,088,418 | 2/1992 | Reckermann et al. ............. 108/55.3 X |
| 5,101,964 | 4/1992 | Westphal ........................... 108/55.5 X |
| 5,105,946 | 4/1992 | McDowell . |
| 5,108,529 | 4/1992 | Shuert . |
| 5,109,985 | 5/1992 | Rose . |
| 5,117,762 | 6/1992 | Shuert . |
| 5,123,541 | 6/1992 | Giannini et al. . |
| 5,143,778 | 9/1992 | Shuert . |
| 5,193,700 | 3/1993 | Lyman et al. ....................... 206/386 X |
| 5,197,396 | 3/1993 | Breezer et al. . |
| 5,255,613 | 10/1993 | Shuert . |
| 5,283,028 | 2/1994 | Breezer et al. . |
| 5,329,862 | 7/1994 | Breezer et al. . |

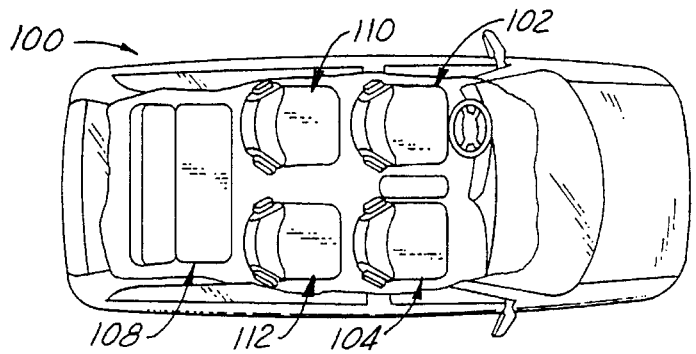
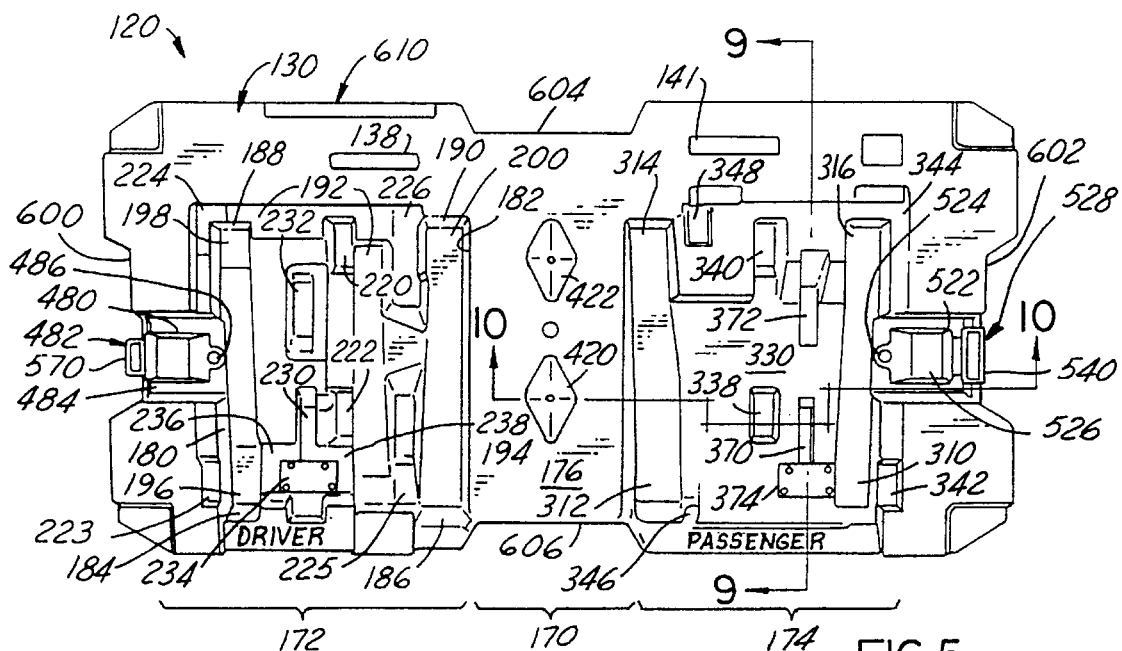
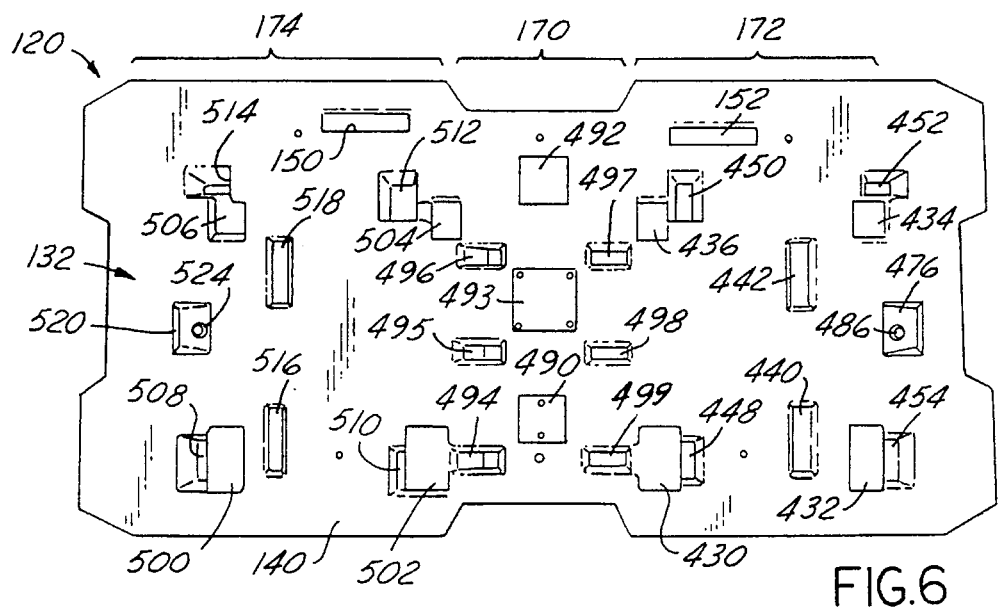

TWIN SHEET PLASTIC PALLET WITH LATCH MEANS

This application is a continuation-in-part of our U.S. patent application Ser. No. 08/319,996, filed Oct. 7, 1994, now U.S. Pat. No. 5,529,185.

FIELD OF THE INVENTION

This invention relates to shipping and storage pallets, and more particularly to a twin sheet thermoformed plastic pallet for use in transporting and storing manufactured goods from their point of origin at a subassembly manufacturing facility to their ultimate delivery to the assembly line of a final assembly facility.

BACKGROUND OF THE INVENTION

As pointed out in our co-pending application Ser. No. 08/319,996, filed Oct. 7, 1994 (which is incorporated herein by reference and assigned to the assignee of record herein) pallets for transporting and storing relatively heavy manufactured articles have traditionally been constructed of wood and metal and, in more recent years of plastic. Soft wood pallets are widely available and easily constructed, but because of the variability of timber characteristics the load carrying capacities and lifetime of wooden pallets are unpredictable. Furthermore, when, due to ordinary wear and usage a wooden pallet must be junked, there is very little salvage value in the scrap wood. Wood pallets are also subject to breakage, thus are not reusable over an extended period of time. Wood pallets also take up a considerable amount of valuable floor space in the factory or warehouse when they are not in use.

Steel pallets, while having increased strength characteristics, are expensive to manufacture. Both wood and steel pallets can be of considerable weight and neither are easily recycled, resulting in additional costs for disposal at the end of their useful life.

Plastic pallets have been gaining increased acceptance due to factors such as consistent physical characteristics and load-carrying capacity, high strength-to-weight ratio, resistance to corrosion, and durability. Plastic pallets also can be manufactured relatively economically to relatively close overall outside dimensional tolerances. Such pallets can also be made with relatively wide, flat planar supporting surfaces, rendering them particularly well adapted to be supported and easily moved on conveyors and the like having live or gravity rolls, "slide-by" side guide walls, automatic track switching arrangements and other automated equipment.

As a result of these and other factors, attempts have been made to develop lightweight plastic pallets that are relatively economical to manufacture but which are of sufficient strength so as to be capable of supporting and handling the large, heavy loads customarily associated with wood and metal pallets. In one generally successful form of plastic pallet design, upper and lower plastic sheets are vacuum formed in separate molding operations in juxtaposed but separated molds. The two sheets are then selectively fused or "knitted" together by closing the molds together to thereby form a reinforced double wall or "twin sheet" structure. Such twin sheet thermoformed plastic pallets may be made on vacuum forming machines such as those shown in the U.S. Pat. Nos. 3,583,036; 3,787,158; and 3,925,140 to Brown.

These twin sheet plastic pallets, although substantially more durable and dimensionally accurate than the wooden pallets they replace, tend to have a substantially higher initial cost than the corresponding wooden pallets due in large part to the relatively high cost of the plastic raw material required to form the pallet. Typically the top and bottom twin sheets of the pallet are made by vacuum forming sheets of organic polymeric material, such as high density polyethylene. It is therefore critical that the twin sheet type of pallet embody a structural design that maximizes the structural strength of the pallet for a given amount of plastic material employed to form the pallet. Accordingly, twin sheet plastic pallets need to be designed to take maximum advantage of the materials used by maximizing the load capacity for the given amount of material used in forming the pallet. Thus the top and bottom pallet deck sheets are vacuum mold formed respectively having dependent and upstanding peripheral side walls joined to one another along a peripheral seam line by fusion of the thermoplastic material while at an elevated temperature and under the pressure of the forming press. This overall configuration thus forms a generally flat, pancake-like hollow clam shell structure having a high strength-to-weight ratio. Additionally, prior art efforts to increase the structural strength of the pallet have included providing a plurality of recessed channels, ribs, pockets, etc., which extend inwardly transversely from the outer major plane of the pallet top and bottom sheets respectively. The two sheets are also selectively fused or knitted together in the press where these interior surfaces of these respective indentations meet and abut in the interior closed space of the pallet. The structures formed by the downwardly depending and upwardly projecting bosses, ribs, etc., fused together provides a rigid reinforced structure which resist deformation of the deck (in addition to reinforcement provided by the fused-together peripheral side walls of the top and bottom sheets).

Another important parameter in the construction of such twin sheet plastic pallets is stackability when empty to minimize storage space and return-transport storage volume. Various complementary nesting configurations have been provided in the opposed planar surfaces of the stacked pallets to facilitate such stacking in a secure stable array.

Whereas such twin sheet pallets of the prior art have been highly successful and have been widely commercialized, hitherto so far as is known, only those so-called "latching pallets" as disclosed and claimed in our aforementioned co-pending U.S. application Ser. No. 08/319,996, have been successfully constructed to have the capability of reliably transporting relatively bulky, heavy and expensive loads such as manufactured subassemblies, particularly those having a high load profile relative to pallet profile, such as automotive vehicle passenger seats. Prior to the advent of our aforementioned "latching pallet" invention, such vehicle seats had been packaged individually in cartons or boxes at the seat manufacturing facility, usually located geographically relatively remote from the automotive final assembly plants, shipped or transported as so containerized, and then handled as packaged goods at the assembly plant for sorting, unpacking and delivery to the assembly stations along the assembly line. These operations require care in preventing damage to the natural or synthetic textile, leather, vinyl sheet and/or seat coverings as well as to the frame and vehicle floor mounting structure of the seats. These as well as other factors have hitherto made the vehicle seating the next most expensive component of the vehicle, after the engine, to manufacture and install in the vehicle. While other vehicle components have been successfully palletized, as plural groups of identical components, prior to the advent of our aforementioned "latching pallet" invention palletization of automotive passenger seats, so far as known, had not been deemed feasible or successfully accomplished utilizing plastic pallet technology available to date to provide twin sheet type pallets adapted for automated roll-conveyor selection, sorting and delivery to assembly line stations to thereby significantly reduce vehicle assembly costs.

Another serious problem posed by shipping, storage and assembly of automotive passenger seats for many types of automotive vehicles resides in the potentially large number of different seat frame constructions encountered to satisfy the variety of seating options currently provided to the customer for a given vehicle. For example, in one popular mini-van vehicle of American manufacture, namely the "Windstar" mini-van model currently manufactured by Ford Motor Company of Dearborn, Mich., eight different interior seating arrangements and combinations are provided utilizing six different seat frames namely: (1) bolt-on-permanent mount type front driver-side single bucket seats, (2) bolt-on-permanent mount type front passenger-side single bucket seats, (3) removable mount two-passenger second row bench seats; (4) removable mount three-passenger third row bench seats; (5) driver-side removable mount single-passenger second row bucket seats; and (6) passenger-side removable mount single-passenger second row bucket seats. The selection of the given assortment of these seat types to provide any one of the eight seating arrangements to satisfy customer orders or provide dealer inventory variety for this mini-van thus posed, prior to the advent of our aforementioned latching pallet invention, an expensive supply and assembly problem for the vehicle manufacturer using hitherthereto available automotive seat carton or container-type packaging, shipping and storage procedures and equipment.

Despite the substantial improvement provided by our aforementioned latching pallet invention over the prior art thereto, there remains the need to further improve our prior invention in terms of reducing the combined weight of the pallet and seat load latching system thereof as well as its cost of manufacture and simplifying the securement of an even greater variety of automotive seat loads while still retaining all of the improved capabilities and advantages thereof.

OBJECTS OF THE INVENTION

Accordingly, it is an object of the present invention to provide an improved low-profile, flat twin sheet thermoformed pallet which is an improvement over our aforementioned latching pallet invention embodiment as described and shown in our aforementioned co-pending application and yet capable of achieving the objects thereof, such as:

(1) capable of carrying and storing relatively, heavy, bulky manufactured components having a high load profile relative to the low flat pallet profile in an economical, secure and reliable manner; and an improved method of constructing and using such pallet in a seat shipment package system of the invention;

(2) having increased durability to accomplish the aforementioned object with only a limited increase in overall weight and associated non-plastic structures;

(3) adapted to solve the aforementioned problems of shipping and storing automotive vehicle passenger seats by enabling secure and removable attachment of such seats thereto, which is easy to load and unload, which is adapted to automated roll conveyor handling systems, which can withstand rough handling with a seat load attached without loss of load or damage to the load, which can accommodate, whether loaded or empty, severely inclined conveyor grades, either ascending or descending, and which has a relatively wide, flat bottom surface capable of transiting conveyor junctions and gaps;

(4) providing an automotive seat shipping system utilizing a universal but vehicle standardized pallet of the aforementioned character which is capable of removable receiving and securely attaching any one of the six different types of vehicle seat constructions, in pallet load groups of one or two, with the seats resting on their feet in so-called "body position", and occupying predetermined positions in a given orientation thereon corresponding to their vehicle orientation in use, in order to provide in a grouping of pallets a vehicle seat load identifiable in advance for shipment from the seat manufacturer to the vehicle final assembly plant under just-in-time inventory supply system conditions so as to automatically deliver to the appropriate assembly line station the correct selection of seating for a given vehicle option in a rapid, reliable, automated and economical manner;

(5) well adapted to carry bar coded identification for automatic selection and sorting among, and selective delivery of, a plurality of such pallets of identical construction but carrying different cargo load components and subassemblies to facilitate automatic delivery directly to the appropriate assembly line stations for removal of cargo from the pallet and installation of the same in the product being assembled along the conveyor line;

(6) achieving all of the aforementioned objects and yet also capable of being stack nested so that the pallets can be securely stacked when empty for storage and shipment in as small an area as possible;

(7) embodying a relatively simple yet strong, reliable and easily operated load latching system and mechanism, and cooperative load nesting pallet structural configuration integrated into the pallet so as to securely but removably retain large, relatively heavy and bulky high load profile articles on the pallet against movement in any direction relative to the pallet; and (8) constructed so as to achieve all of the aforementioned objects, while also being readily manufacturable efficiently and economically from conventional thermoplastic materials utilizing existing twin sheet thermoplastic vacuum forming manufacturing equipment and technology and with a minimum of manufacturing steps and expense.

Another object of the present invention is to provide an improved embodiment of a pallet of the aforementioned character which, relative to the latching pallet embodiment disclosed in our aforementioned co-pending application Ser. No. 08/319,996, is less costly to manufacture, which has a load securing system incorporated therein imposing fewer pallet design constraints and more readily adaptable for different pallet constructions to thereby provide a greater variety of load-carrying configurations and which is easier to operate, service and maintain.

BRIEF DESCRIPTION OF THE DRAWING FIGURES

The foregoing as well as other objects, features and advantages of the present invention will become apparent from the following detailed description, appended claims, and accompanying drawings (which are to scale unless otherwise indicated) wherein:

FIGS. 3 and 4 are top plan views of a typical current model mini-van, with the roof portion broken away to illustrate two of the possible eight different seating layouts of the aforementioned mini-van;

FIGS. 5 and 6 are plan views respectively illustrating the exterior configuration of the upper and lower sides of the top and bottom decks of the pallet shown in FIGS. 1 and 2 when empty;

Figure 1:
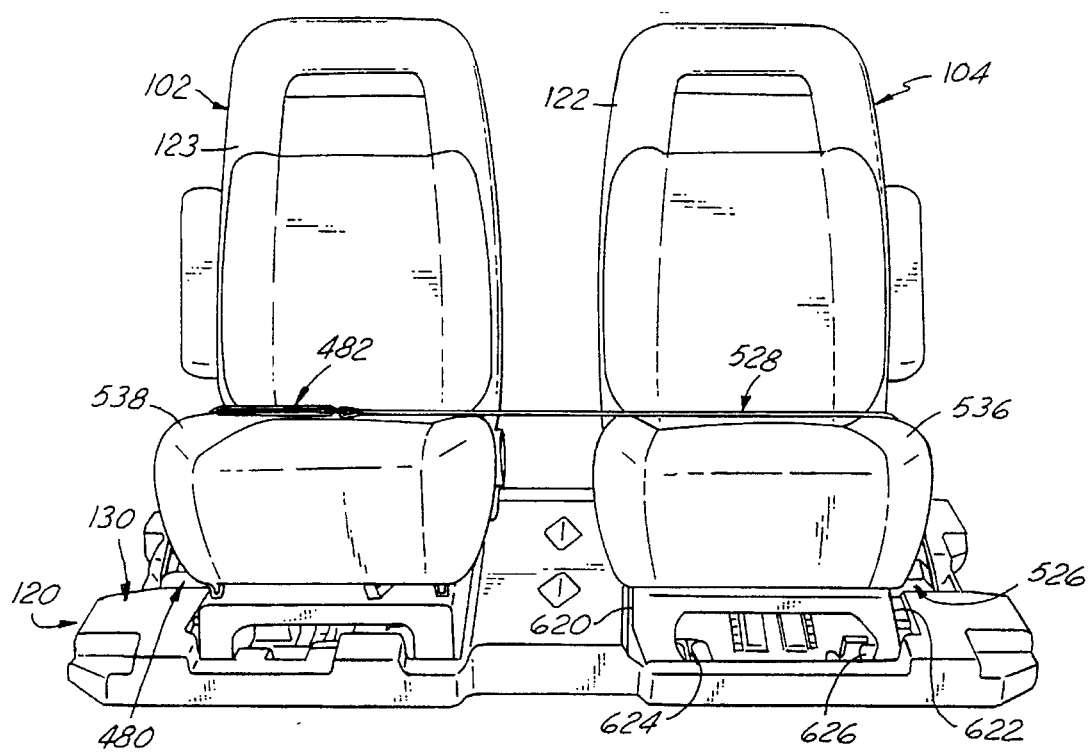
FIG. 1 is a perspective front view of a mini-van front row passenger and driver seats removably mounted and secured side-by-side for shipment and storage in "body position" upon an exemplary but preferred embodiment of a twin sheet thermoplastic pallet constructed in accordance with the present invention.
Figure 2:
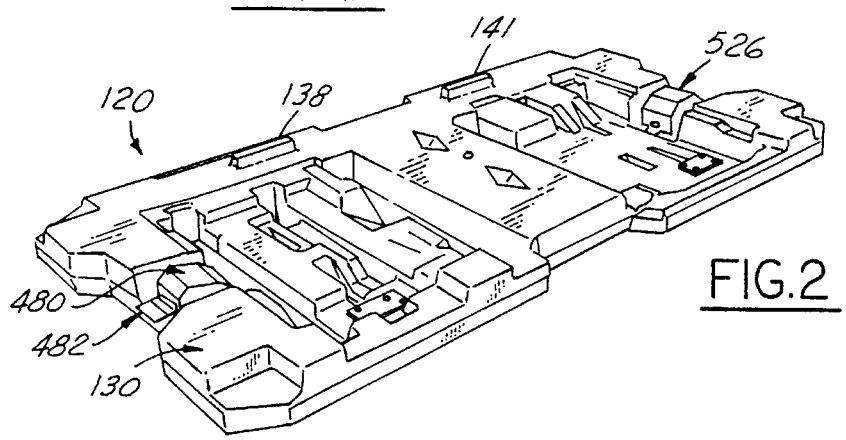
FIG. 2 is a perspective view illustrating the exterior configuration of the upper side of the top deck of the pallet shown in FIG. 1 when empty of any cargo load thereon.
Figure 9:
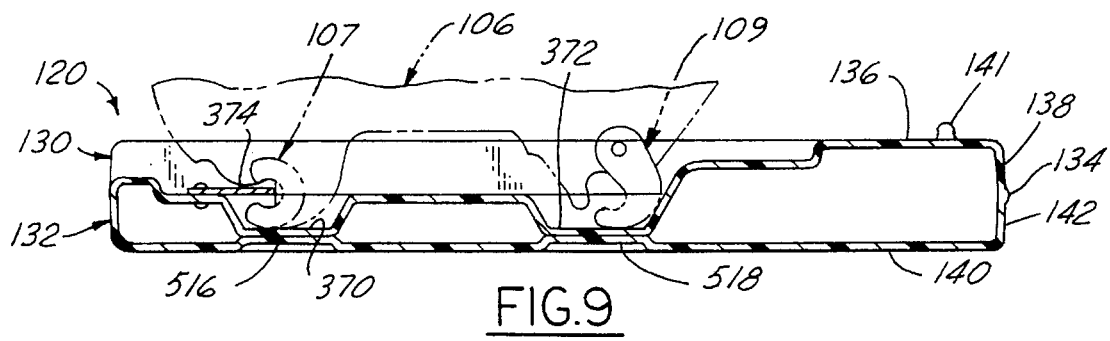
Figure 10:
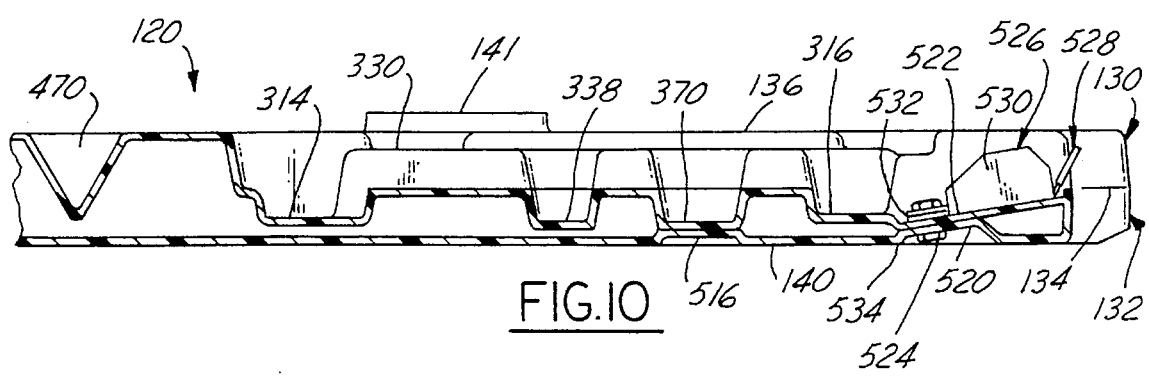
Figure 11:
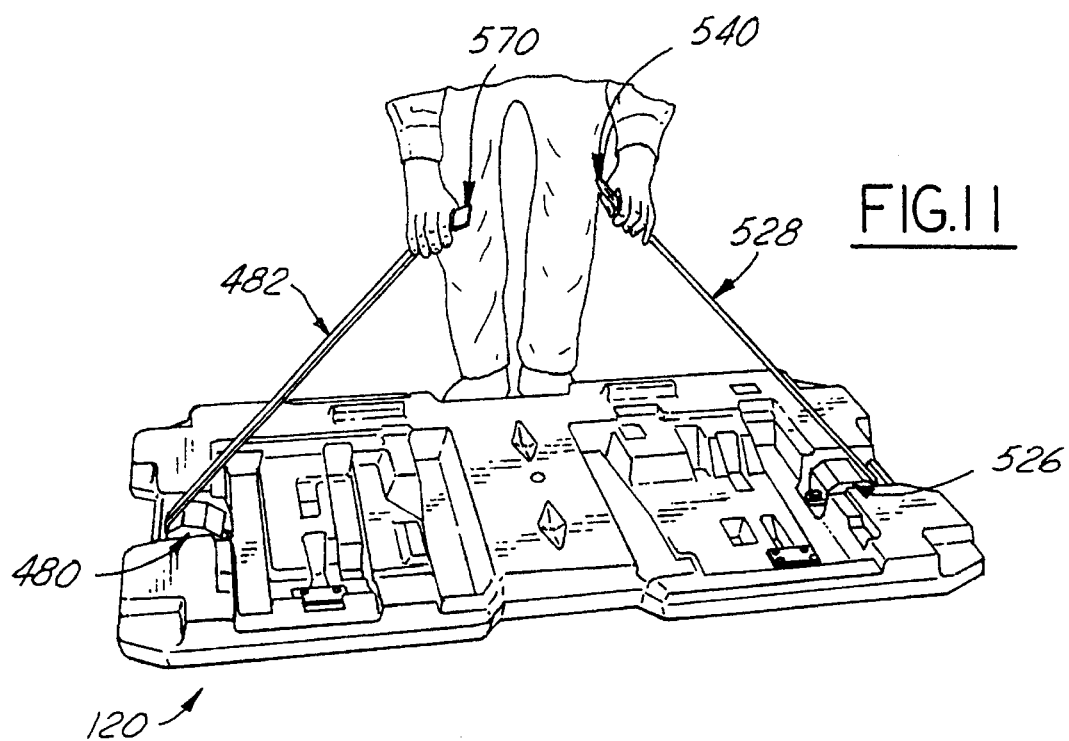
Figure 16:
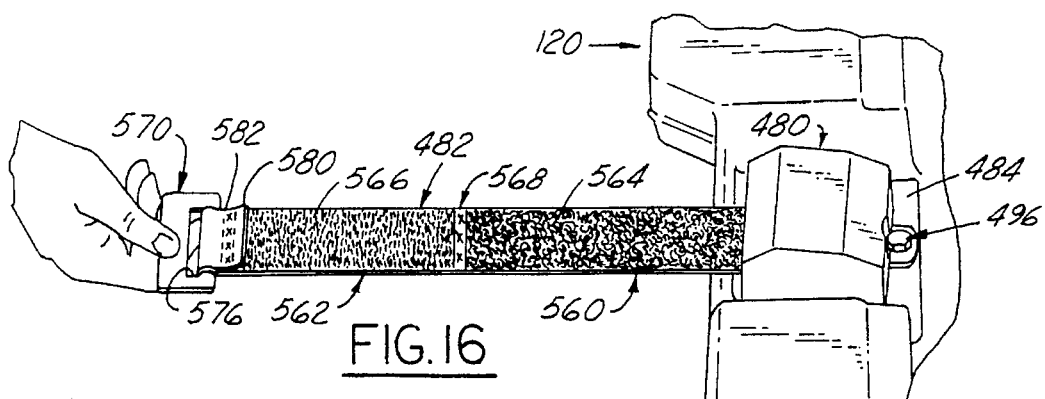
Figure 17:
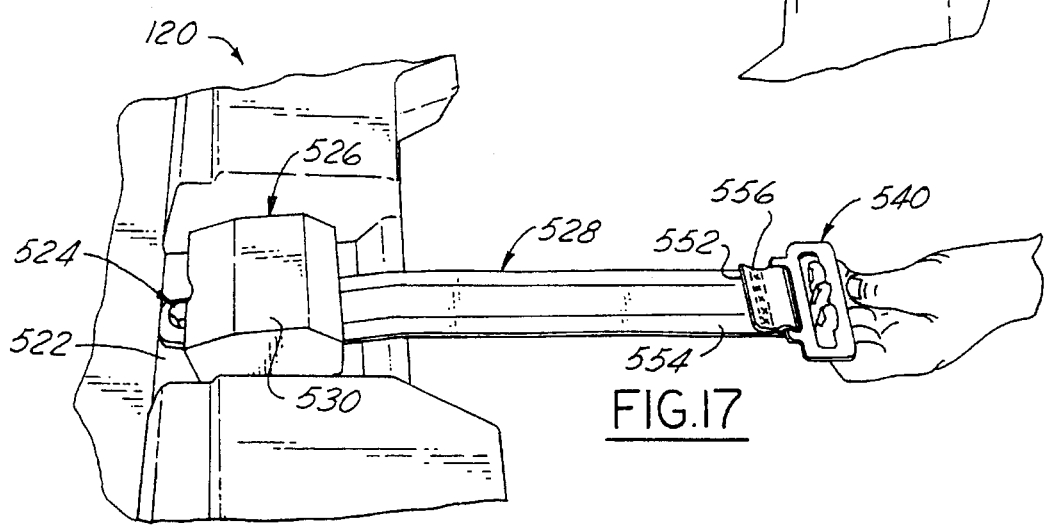
Figure 18:
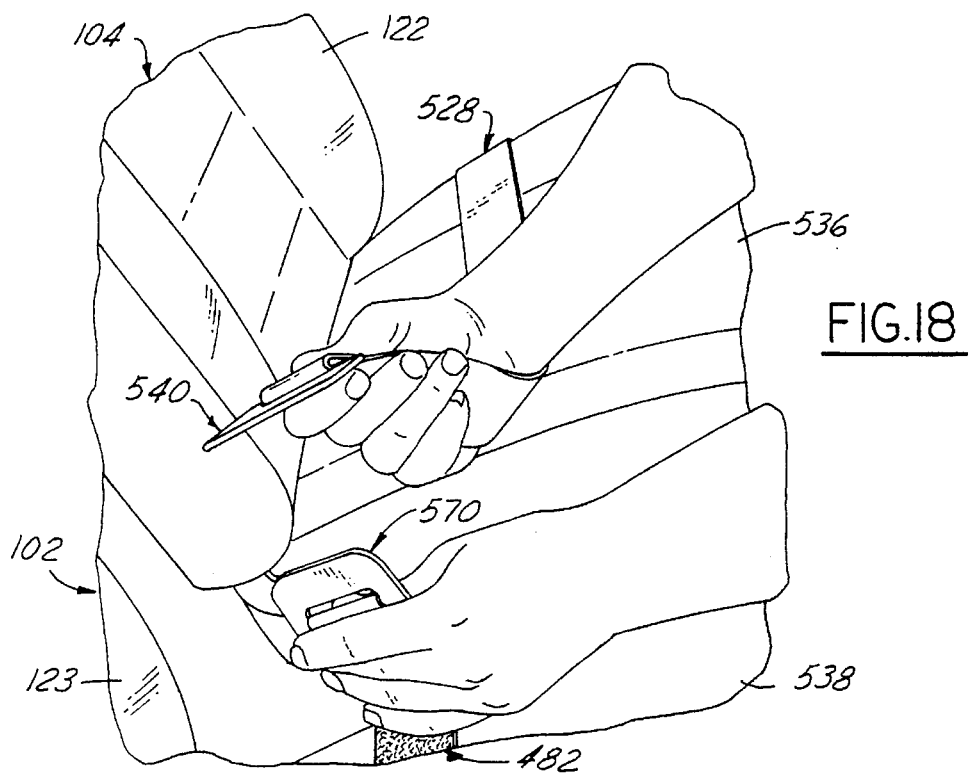
Figure 19:
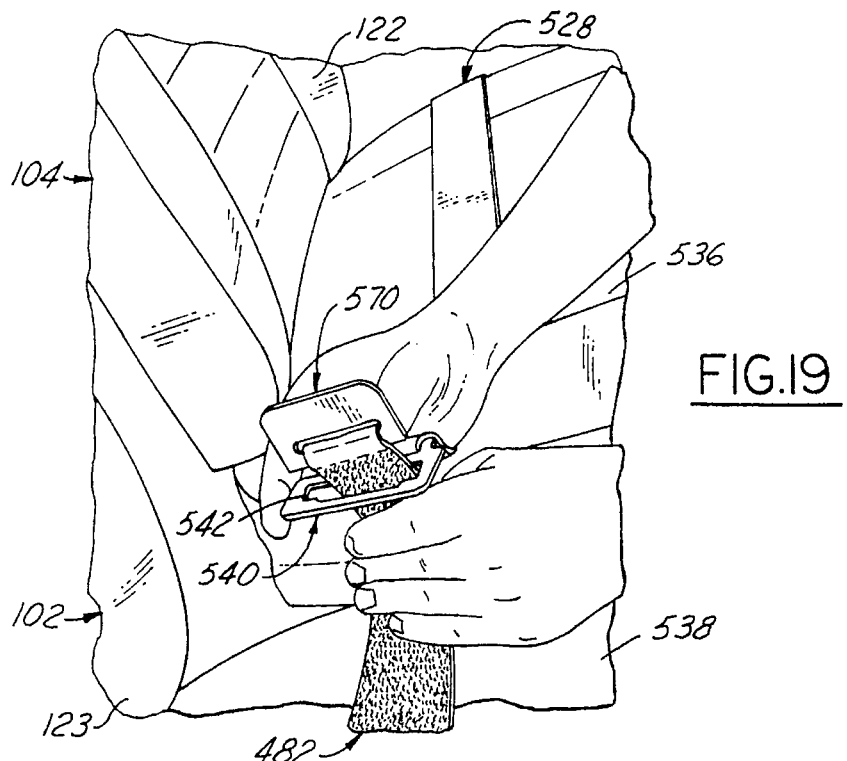
Figure 20:
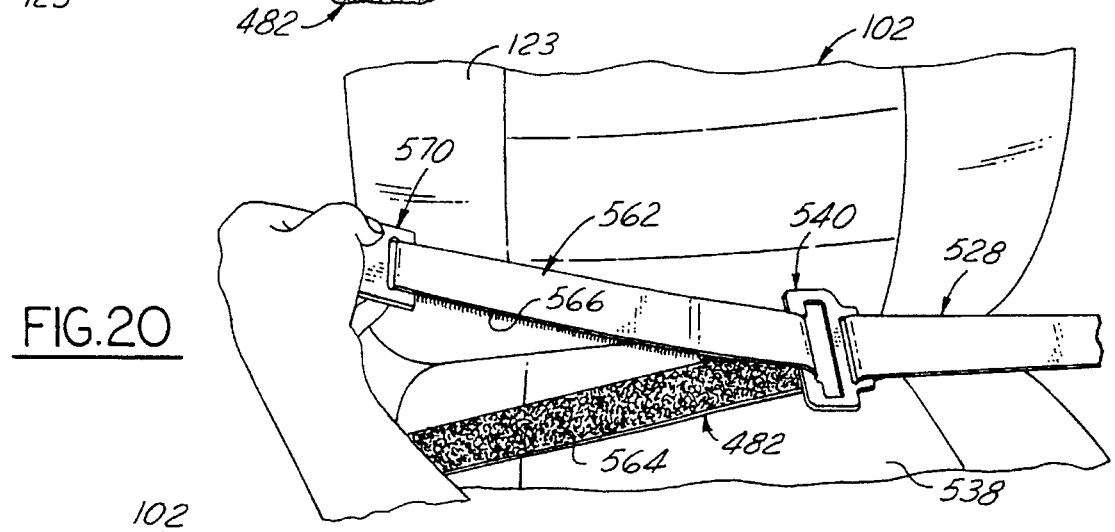
Figure 21:
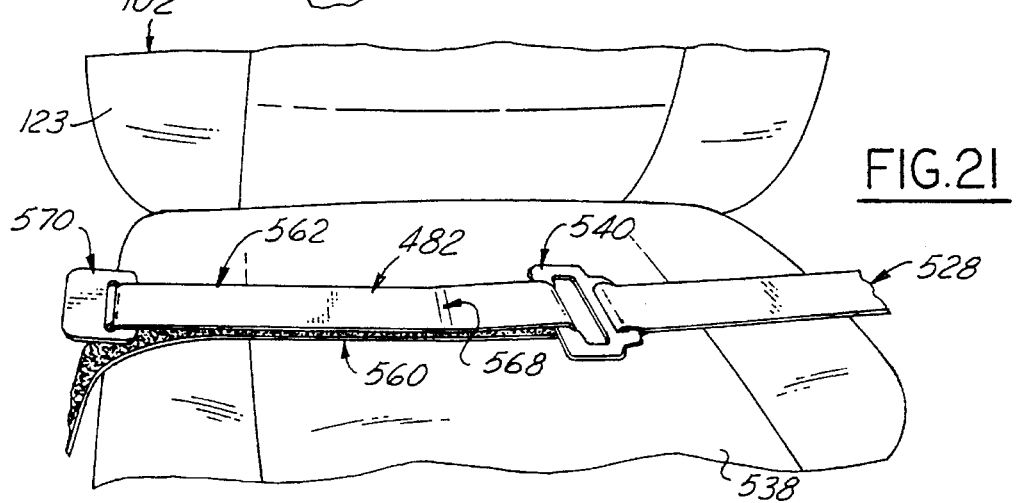
Figures 22, 23:
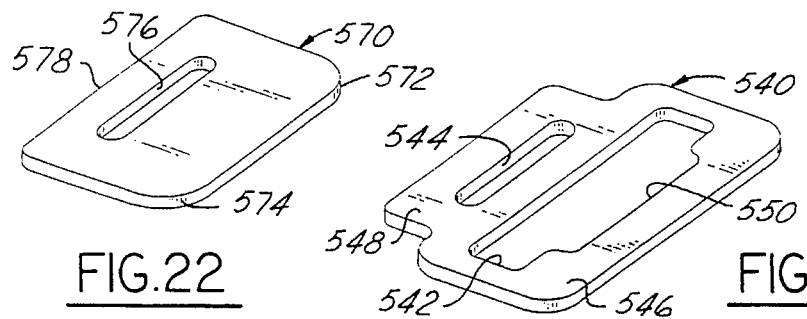
Figure 24:
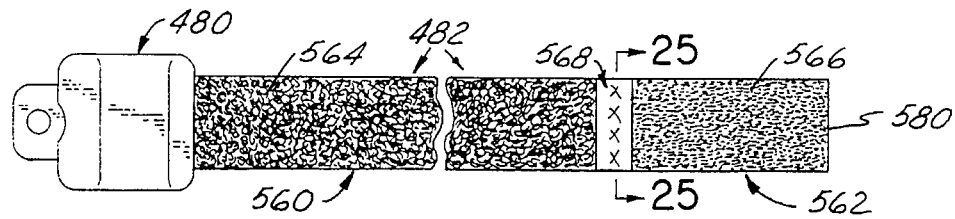
Figure 25:
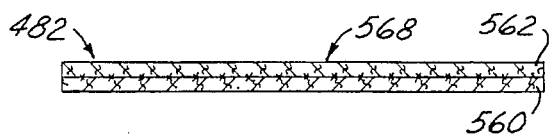
Figure 26:
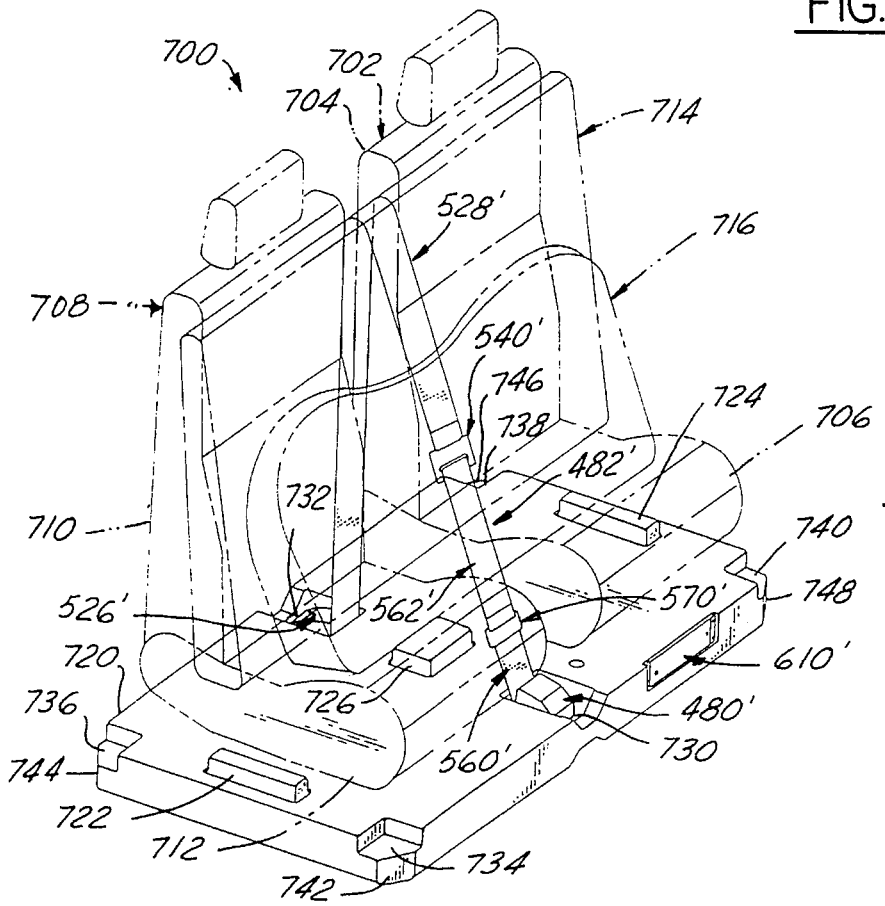

FIGS. 9 and 10 are vertical cross-sectional views taken respectively on the lines 9—9 and 10—10 of FIG. 5;

FIGS. 11, 12, 13, 14 and 15 are fragmentary perspective views of the upper side of the empty pallet of FIG. 2 illustrating in sequence operating steps in manually operating the seat belt latch mechanism of the invention;

FIG. 16 is a fragmentary perspective view illustrating manually pulling out the left hand side belt from its associated retractor mounted on the left side of the pallet top deck;

FIG. 17 is a fragmentary perspective view illustrating the initial manual pull out of the right hand side belt from its associated retractor mounted on the right side of the pallet top deck;

FIG. 18 is a fragmentary perspective view illustrating the step of manually bringing together the interengageable ends of the left and right belts over the pallet mounted driver and passenger-side seats after they have been initially drop-mounted on the pallet as shown in FIG. 1;

FIG. 19 is a fragmentary perspective view illustrating the step following that of FIG. 18 of inserting the male buckle of the left hand belt through the female buckle of the right hand belt to thereby initially interengage the belts as trained over the upper surfaces of the seat bottoms of the passenger and driver-side seats;

FIG. 20 is a fragmentary perspective view illustrating the step of cinching take-up of the interengaged belts by drawing the left hand belt male buckle away from the right hand belt to thereby tension the belts into snug seat hold-down relationship relative to the pallet;

FIG. 21 is a fragmentary perspective view illustrating the final step of latching the left and right hand belts into releasably secured, interengaged relationship by laying the hook material of the left belt downwardly against and into the juxtaposed loop material of the left hand belt;

FIGS. 22 and 23 are perspective views respectively of the male and female buckles of the left and right belts each shown by themselves in these views;

FIG. 24 is a fragmentary top plan view of the left hand belt and associated retractor;

FIG. 25 is a fragmentary vertical cross sectional view taken on the line 25—25 of FIG. 24; and FIG. 26 is a semi-diagrammatic perspective view of a modified embodiment of a pallet and seat shipment system and package of the invention.

DESCRIPTION OF PREFERRED EMBODIMENTS

Pallet Seat Loads for Mini-Van Seating Arrangements

Figure 3:
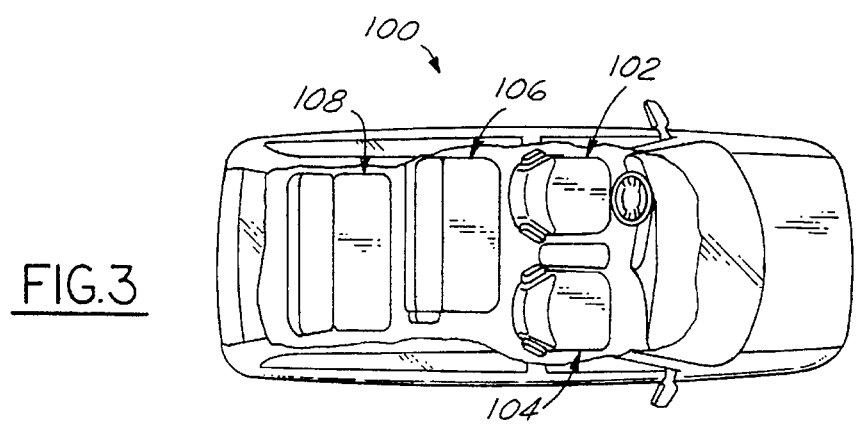

Referring first generally to FIGS. 1–5, and by way of background introduction to the construction and use of a shipping pallet constructed in accordance with the present invention, the first embodiment of such a pallet 120 as illustrated by way of example in these views is particularly constructed and arranged to solve the perplexing problem of accommodating for palletized shipment and storage of fully assembled automotive vehicle seats, with only one standardized twin sheet plastic pallet design, the six different seat-to-vehicle mounting structures encountered in providing eight possible different seat layouts as offered to the purchasing public for use in a Ford Motor Company "Aerostar" model mini-van. Two of such van seating layouts are shown in FIGS. 3 and 4 respectively.

In FIG. 3, an "Aerostar" van 100 is shown in plan view (with the roof broken away so that the seating layout is visible from above the van) which consists of a front row driver-side bucket seat 102, a front row passenger-side bucket seat 104, a second row two-passenger bench seat 106, and a third row three-passenger bench seat 108. The front seats 102 are permanently mounted in vehicle assembly on the passenger compartment floor of van 100 by suitable bolts and studs. The second and third row bench seats 106 and 108 are each removably mounted on the passenger compartment floor so that one or both can be removed by the van user as desired to alter the passenger and cargo load carrying capacity and configuration of the van interior.

FIG. 4 illustrates another of the eight seating options of van 100 wherein the second row bench seat 106 has been removed and replaced by a second row driver-side bucket seat 110 and a second row passenger-side bucket seat 112. The second row bucket seats 110 and 112 are also removably mounted on and latched to seat mounting structure provided in the floor of the passenger compartment of the van.

In addition to the foregoing seats, mini-van 100 is also designed to accommodate specially constructed second row infant safety seats, one or two of which can be mounted in place of the corresponding second row bucket seats 110 and/or 112, but which have the same seat undercarriage seat-to-floor mounting structure and layout as bucket seats 110 and 112, respectively.

Hence for mini-van 100 there are six basic but individually different seat undercarriage framework configurations. Front row seats 102 and 104 have identical under side framework and floor mounting structures but are not interchangeable between driver-side and passenger-side because of different seat slide latch release bar layouts as well as the additional power operating options offered for the front row driver seat 102. The second row bench seat 106 and third row bench seat 108 likewise have similar seat undercarriage framework constructions and releasable floor mounting feet, and for the aforementioned "Aerostar" van 100 their spacing longitudinally of these seats is the same despite the second row bench seat 106 being shorter in length than the third row bench seat 108. The second row bucket seats 110 and 112 have have a centrally disposed single pair of front and rear releasable floor-fixture-engaging claw structures similar to the two pairs used one on each of side of the bench seats 106 and 108. Beats 110 and 112 each have their two underside side frame members, each with associated front and rear flat feet, lateral spaced apart even less than that of the front row single passenger seats 102 and 104. Also, such frame spacing of the passenger-side second row seat 112 is slightly less than that of its companion seat 110.

Nevertheless, the first embodiment 120 of a shipping pallet provided in accordance with the invention will readily accommodate selectively all six of these van seat undercarriage types, while utilizing a plurality of only one and the same identical pallet 120, thereby enabling a variety of seat loads to be pallet-loaded and shipped in a preselected and predetermined manner to meet the "just-in-time" and diverse seat supply requirements of the automobile vehicle assembly plant.

Thus, as seen for example in FIG. 1, a front row driver seat 102 and front row passenger seat 104 are shown mounted and belt-latched securely side-by-side onto the top deck 130 of palletizing these seats. Seats 102 and 104 are thus pallet-package shipped with their respective hinged backs 122 and 123 locked upright in "body position" (i.e., their normal vehicle assembled, user-occupied orientation) as shown in FIG. 1.

Pallet 120 when thus dual loaded with seats 102 and 104 with each seat individually mounted upon and cojointly securely belt-latched to the pallet, is ready for transport and delivery to the auto assembly plant and conveyance therein automatically on automated conveyor line equipment all the way to the appropriate assembly line seat-to-vehicle installation station.

Preferably the individual seat mounting locations on pallet 120 are readily visually identifiable by the molded-in legends "DRIVER" and "PASSENGER" appearing along the top surface of top deck 130 adjacent the front edge side 126 of pallet 120, as best seen in FIG. 5. Although as illustrated these legends are reversed relative to seat placement in a left hand drive vehicle, such reverse arrangement may be specified by the vehicle assembly plant for a given vehicle to better accommodate pallet unloading for a particular seat assembly sequence in the vehicle. Thus, even though, in the absence of such legends the front row driver-side and passenger-side seats 102 and 104 could be inadvertently mis-mounted in the passenger and driver mounting locations respectively on pallet 120, the seats will be properly located on the pallet by observing their location labels, thereby also facilitating correct assembly line station pallet unloading and helping insure error-free seat installation in the vehicle.

The second row bench seat 106 (FIGS. 3 and 4), like third row bench seat 108, is mounted on and belt-latched to pallet 120 as a single-seat load (not shown but discussed in more detail hereinafter).

The second or mid-row driver-side and passenger-side bucket seats 110 and 112 (FIGS. 3 and 4) are typically loaded on pallet 120 similar to front seats 102 and 104, in the appropriate "driver" and "passenger" locations, as a dual-seat load (not shown but discussed in more detail hereinafter). The aforementioned optional second row child safety seats may also be palletized as a dual-seat cargo load on pallet 120, and are located, mounted and belt-latched in shipping condition in the same manner as the second row bucket seats 110 and 112.

It is also to be understood that pallet 120 may only have a single-seat load, if desired, for any one of the bucket seats 102, 104, 110, or 112, and also that one of the front row seats 102 and 104 may be paired to create a dual load with the appropriate one of the mid-row bucket seats 110 or 112 on the same pallet 120, if desired.

It will thus be seen that three of the pallets 120 can be individually loaded with the appropriate seat selections to provide the seating layout of FIG. 3 for mini-van 100, and likewise for the alternative seating layout of the mini-van shown in FIG. 4. Each of these different seat loads is so identified at the seat plant by removably attaching to label holders provided on one of the sides or ends of pallet 120 an appropriate bar code and plain language label identifier.

General Construction of Pallet 120

With the aforementioned introductory background in mind, the construction of pallet 120 will now be described. In general, pallet 120 is particularly adapted to be constructed of vacuum moldable material, such as a suitable thermoplastic sheet material, as will be described in more detail later. As will be evident from the drawing figures, pallet 120 comprises a substantially planar load-bearing member of suitable constant thickness and having a very low aspect ratio. Pallet 120 is formed of two separate sheets of material, namely an upper sheet which is used to form the top deck 130 of the pallet, and a lower sheet which is used to form the lower deck 132 of the pallet. These two sheets may be fused together in a conventional twin sheet thermoforming process at a pallet mid-thickness continuous peripheral seam 134 (FIGS. 7–10) to form a hollow structure. The two sheets of material will thus be largely positioned parallel to each other and separated by the width of pallet 120 itself. Pallet 120 is substantially rectangular in plan and elevations and may be of any suitable standard pallet dimensions, but for the illustrated van seat shipping use pallet 120 is preferably made 60 inches long, 30 inches wide, and 3½ inches thick (as measured between the opposed major planar surfaces 136 and 140 of the top and bottom decks 130 and 132 respectively).

Pallet top deck 130 and bottom deck 132 are preferably formed of high density polyethylene in a conventional twin sheet thermoforming process. In this process, the upper flat starting sheet for deck 130 is seated and formed in an upper mold and then pressed into engagement with the lower sheet of deck 132, which also has been first vacuum thermoformed in a lower mold. Portions of the upper and lower sheets 130 and 132 which are forced together as the separate molds are brought together are fused together at pinch points, known as "knit points", to form an integral continuous double ply plastic part at these knit points. Whereas various plastic materials may be used for the sheets to form twin sheet pallet 120, preferably high density polyethylene (for example, that commercially available as sold under the trademark "PAXON BA 50–100" by Paxon Polymer, and having a density of approximately 0.95 grams per cubic centimeters) provides a preferred material since, in a heated state, it readily and totally fuses with itself and since it takes on heat slowly and releases heat slowly so as to be compatible with the relatively long cycle times required for forming plastic pallets utilizing the twin sheet methodology.

The thickness of the sheets 130 and 132 may also vary depending upon the application, but a uniform starting sheet thickness of 0.187 inches has been found preferable for the illustrated application of pallet 120.

The upper and lower sheets of decks 130 and 132 are thus fused or knitted at the interface of the peripheral flange portion 134 and at various points elsewhere interiorly of pallet 120 as indicated hereinafter. The generally flat top surface 136 of upper deck 130 merges integrally on all four of its side edges with a vertically dependent peripheral side wall 138 (FIG. 9). Likewise the generally flat surface 140 of lower deck 132 merges integrally on all four of its side edges with an upstanding peripheral side wall 142. Side walls 138 and 142 meet at the peripheral lip 134, which is thus formed by the edges of the sheet material of decks 130 and deck 132 being permanently fusion joined together around the periphery of pallet 120 at a parting line generally half way between final formed planar surfaces 136 and 140 of the two sheets of the pallet forming material.

This generally flat, hollow clam-shell type construction of pallet 120, with the integral peripheral side walls joined at the center lip 134, provides substantial initial stiffness and compressive stress resistance to pallet 120 adjacent the rectangular periphery of the same. Additional compressive stress resistance or stiffness perpendicular to the major planes of the pallet, i.e., vertically in the conventional orientation of the pallet in use, is obtained primarily by a plurality of additional knit points provided throughout the pallet which are also functionally cooperative as seat foot bearing reinforcements for the variety of automotive seat cargo loads to be carried by pallet 120.

Stacking of Pallets In Nested Relationship

Figure 7:
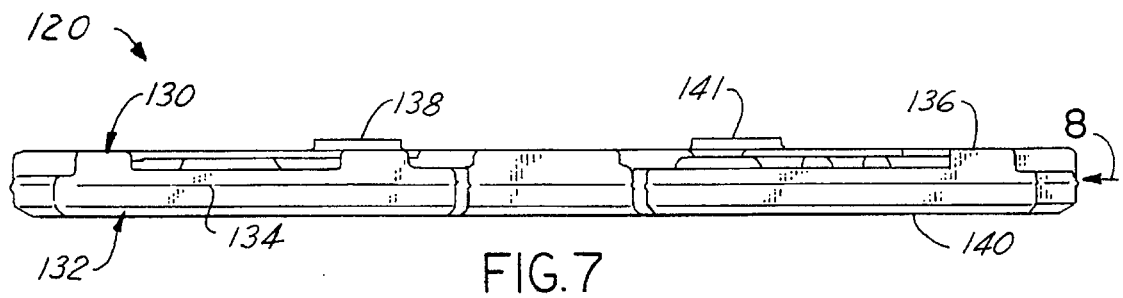
FIG. 7 is a side elevational view of the front side of the pallet of FIGS. 1, 2, 5 and 6.
Figure 8:
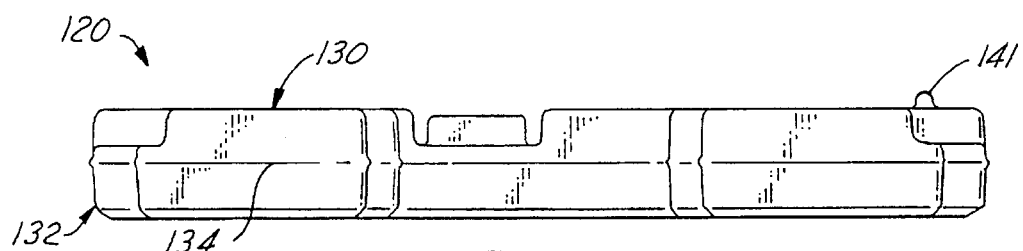
FIG. 8 is an end elevational view of the right hand end of the pallet as viewed in the direction of arrow "8" in FIG. 7 and enlarged thereover.

As will be seen in FIGS. 2 and 5–10, and particularly in FIG. 7, pallet 120 is quite "thin", having a relatively small, vertical dimension compared to its length and width (i.e., low-aspect ratio). Hence a plurality of empty pallets 120 may be stacked flat one on top of another so as to occupy a minimum of storage or transport space when empty. When one pallet 120 is superimposed in stacked relation upon another pallet 120, the primarily flat portions of undersurface 140 of lower deck 132 of the upper pallet 120 will rest upon the flat, coplanar portions of the upper surface 136 of upper deck 130 of the lower pallet 120 in generally coplanar, face-to-face abutment to maintain the two pallets 120 parallel as stacked.

Interlock nesting of an upper pallet 120 so stacked on a lower pallet 120, so as to prevent relative movement between the stacked pallets in any direction in their mating major deck planes (typically horizontal), is thus provided by upwardly protruding nesting projections on upper deck 130 and corresponding nesting recesses in lower deck 132 of each pallet 120. More particularly, upper deck 130 of pallet 120 has a pair of risers 138 and 140 formed adjacent the rear longitudinal side edge of the pallet respectively adjacent the pallet passenger and driver seat compartments 172 and 174. Risers 138, 141 are generally of trapezoidal shade in elevation and each protrude vertically upwardly above the plane of surface 136 about one inch. Each riser 138, 141 has a horizontally extending flat top surface and end surfaces inclined to surface 136 in an upwardly mutually convergent direction.

Bottom deck 132 likewise has a pair of corresponding nesting recesses 150 and 152 formed adjacent the rear longitudinally side edge of the pallet and opposite risers 138 and 141. Each recess 150, 152 has surface complemental to the corresponding riser surfaces for nesting engagement. Thus, when an upper pallet 120 is lowered to rest its bottom deck 132 upon upper deck 130 of a pallet 120 therebelow, with their respective perimeter outlines registered, risers 138 and 141 of the lower pallet will respectively register with and nest in mating recesses 150 and 152 of the upper pallet to lock the two pallets against movement laterally and longitudinally thereof in the major planes of the flat mutually abutted decks. The inclined ends of each riser 138, 141 assist in slidably cam guiding each riser into the associated recess by engagement with the associated recess end walls should the pallets be slightly laterally misaligned during registration and superimposition thereof, thereby enabling rapid and rough handling of the pallets when stacking the same.

General Configuration of Pallet Top Deck

As best seen in FIG. 5, the configuration of the top deck 130 of pallet 120 generally subdivides longitudinally into three main areas, namely a longitudinally centered platform area 170 flanked by a driver-side compartment 172 and a passenger-side compartment 174, as respectively indicated by the brackets so numbered in FIG. 5. Platform 170 has a flat upper surface 176 coplanar with the main upper surface plane 136 of top deck 130. Compartments 172 and 174 are generally rectangular in plan view and define major seat nesting pockets recessed downwardly from the elevation of platform surface 176 and main deck plane 136 for respectively selectively receiving driver-side single-person seats 102 or 110 and passenger-side single-person seats 104 or 112. Each nesting compartment 172 and 174 is constructed and arranged such that, when the foot seat framework is partially nested and gravitationally secured in its associated compartment of pallet upper deck 130, the nested seats are securely restrained against movement longitudinally and laterally relative to pallet 120.

Driver-Side Seat Nesting Compartment of Top Deck

More particularly, and as detail numbered in FIG. 5, driver-side seat nesting compartment 172 is peripherally defined by opposed generally vertical side walls 180 and 182 spaced apart longitudinally of top deck 130, a pair of coplanar generally vertical front end walls 184 and 186 spaced apart laterally of deck 130, and a pair of coplanar generally vertical rear walls 188 and 190. The central area of compartment 172 is defined by a main flat floor surface area 192 located at an elevation slightly above midway between the opposed major planar surfaces 136 and 140 of pallet 120. The horizontal surface areas of compartment 172 at each of its four corners is defined by pocket floors 194, 196, 198 and 200 located coplanar with one another and recessed below main floor 192 of compartment 172. These pocket floors are designed to individually nestably receive and support thereon the four corner feet of the driver-side passenger seat 102.

Driver-side seat nesting compartment 172 is further provided with front and rear seat mounting pockets 220 and 222 for respectively nestably receiving and supporting the centrally disposed front and rear claws of the mid-row driver-side bucket seat 110. The outboard and inboard pairs of front and rear flat feet of seat 110 respectively rest on shallow pockets 223, 224, 225 and 226 provided above and to the left of pocket sats 196, 198, 194 and 200 respectively.

Platform subsurface 192 also includes fore and aft seat-foot nesting pockets 230 and 232 respectively for nestably receiving and supporting the passenger-side and front and rear feet of either of the bench seats 106 or 108. A mounting plate fixture 234 is affixed by pop rivets to recessed surfaces 236 and 238 to span the front of pocket 230 for removable engagement with the claw latch of the passenger-side front foot of either seat 106 or 108.

Passenger-Side Seat Nesting Compartment of Top Deck

Referring to FIGS. 2 and 5, the passenger-side seat-nesting compartment 174 of top deck 130 also comprises, like compartment 172, a generally rectangular recessed pocket having flat, fully recessed front row passenger-side seat mounting surfaces 310, 312, 314 and 316 defining the four seat-foot-supporting corners of the rectangular pocket.

Compartment 174 also has a central platform surface 330 extending horizontally slightly below mid-elevation between the upper and lower main surfaces 136 and 140 of pallet 120. A pair of seat-foot support pockets 338 and 340 provide support surfaces recessed and extending horizontally below the elevation of surface 330, and co-planar with support surfaces 312 and 314. Pockets 338 and 340 respectively nestably receive and support the centrally disposed front and rear claws of mid-row passenger-side single seat 112. The outboard and inboard pairs of front and rear flat feet of seat 112 respectively rest on shallow pockets or edges 342, 344, 346 and 348 provided above and to the right of pocket seats 310, 316, 312 and 314 respectively.

Passenger-side center platform 330 of compartment 174 also has a pair of seat-foot support pockets 370 and 372 that are aligned laterally of pallet 120 and coplanar with seat-foot support surfaces 230 and 232. The front and rear driver-side feet of either mid-row bench seat 106 or third row bench seat 108 are respectively nestably received and supported in pockets 370 and 372 while the front and rear passenger-side feet of seats 106 or 108 being respectively nestably received and supported in pockets 230 and 232 as set forth previously. A mounting plate fixture 374 is affixed by pop rivets to platform surface 330 to span the front of pocket 370 for removable engagement with the claw latch of the driver-side front foot of either seat 106 or 108.

Central Platform Structure of Top Deck

The central platform area 170 of deck 130 also has a pair of stiffening recesses 420 and 422 (FIG. 5) having integral side walls dependent from surface 176 conjointly of diamond configuration in horizontal cross-section to define inverted pyramidal shaped pockets centrally of pallet 120.

Configuration of Pallet Bottom Deck

The configuration of the bottom deck 132 of pallet 120 is best seen in FIGS. 6 and 7–10. As indicated in FIG. 6, bottom deck 132 can also be subdivided into the three areas 170, 172 and 174 described previously with reference to the companion FIG. 5 illustrating the layout of top deck 130. The driver-side zone 172 of bottom deck 132 includes the aforementioned nesting recess 152, as well as four recesses 430, 432, 434 and 436 individually defining rectangular knit point bosses which protrude upwardly from surface 140 into the hollow interior of pallet 120 and abut in flat face-to-face knit engagement with the corresponding downwardly recessed flat bottom wall of top deck seat foot surfaces 194, 196, 198 and 200. In the twin sheet thermoforming process of making pallet 120, these recess bottom walls of the upper and lower decks are pressed together while at a sufficiently elevated temperature to cause these two deck walls to be joined by fusion of the thermoplastic material to thereby establish a "knit" zone in pallet 120 disposed at an elevation approximately midway between the top and bottom major surfaces 136 and 140 of pallet 120. The same "knitting" of the top and bottom decks 130 and 132 is provided between the flat walls of the interiorly protruding bosses of the registering recesses 194/430, 196/432, 198/434 and 200/436.

Driver-side area 172 of bottom deck 132 also includes several further knit boss recesses formed by corresponding integral bosses protruding upwardly interiorly of the pallet from bottom deck 132 to abut face-to-face against and be fusion knitted to the downwardly protruding interiorly protruding bosses formed in upper deck 130 corresponding to the previously described recesses embossed in the horizontal surfaces of top deck 130. Thus bottom deck recesses 440 and 442 provide flat boss walls which mate with and are fused to top deck seats 230 and 232 respectively. Likewise the bottom deck has recesses 448, 452 and 454 defined by upwardly, interiorly protruding bosses having flat walls which are knitted to the undersurface of top deck seats 225, 226, 224 and 223 respectively for reinforcing the pallet 130 in these seating areas.

Bottom deck zone 172 also includes a recess 476 for supporting a seat belt retractor mechanism 480 (FIG. 5) which serves as a spring-wound retainer for an extensible seat retaining belt 482 described subsequently herein. The ceiling wall of bottom deck recess 476 forms a double-ply knit wall with the bottom wall top deck recess 484 as part of these back-to-back recesses in top deck 130 and bottom deck 132. A cut out through-hole in this knit wall provides a mounting opening through both decks 130 and 132 for receiving a retractor mounting fastener 486, also as explained in more detail hereinafter.

The central zone 170 of bottom deck 132, includes a pair of square recesses 490 and 492 and having flat ceiling walls which are knitted to the apex boss wall of top deck recess 470 and 472 respectively of top deck 130. Zone 170 also includes a centrally located shallow, unknit rectangular recess for mounting therein of a metal plate 493 to provide a sensor-identifiable target on deck 132. Two rows of recesses 494–499 flanking recess 490, 492 knit with top deck central surface 176 for reinforcing this area of the pallet.

The passenger-side zone 174 of bottom deck 132 is generally constructed as a duplicate repeat of driver-side bottom deck zone 172. Thus zone 174 of deck 132 is characterized by its main surface 140 having a series of rectangular recesses as defined by upwardly and interiorly protruding bosses with flat seating support knit walls 500, 502, 504 and 506 which respectively are knitted to top deck seating walls 310, 312, 314 and 316. Likewise, additional bottom deck recesses 508, 510, 512 and 514, as well as 516 and 518, provide bottom deck boss walls which are knitted to the bottom walls of corresponding upper deck seats 342, 346, 348 and 344 respectively, and to seats 370 and 372 respectively (see also FIG. 9), for added reinforcement. The ceiling wall of a recess 520, constructed identical to recess 476, knits to the bottom wall of a top deck recess 522 (FIGS. 5, 6 and 10). A through-opening cut through these knit walls receives a fastener 524 for securing another seat belt retractor mechanism 526 in recess 522 which serves as a spring-wound retainer for another extensible seat retaining belt 528, described in more detail hereinafter.

Pallet Seat Belt Latching Mechanism

In accordance with another and principal feature of the present invention, pallet 120 also includes the aforementioned pre-fabricated seat belt latch mechanism subassemblies 480/481 and 526/528 (FIG. 5) permanently installed on the pallet (FIGS. 5 and 10) in top deck recesses 484 and 522 so as to be nested in assembly on pallet 120 to provide a manually operable releasable load-locking belt latch system, as also seen in FIGS. 1 and 11–21. Details of the belt latch mechanism components are best seen in the views of FIGS. 16, 17 and 22–25.

The belt latching mechanism subassemblies 480/482 and 526/528 include separately fabricated belt retractor mechanisms 482 and 528, identical to one another and preferably made from commercially available automotive safety seat belt retractor mechanisms of the floor-mounted type. One such retractor mechanism is that made commercially by AM-Safe Commercial Products, Inc. of Phoenix, Ariz. as Model No. 503953. These retractor mechanisms typically include a U-shaped stamped metal plate frame to provide a trunion support for a belt winding spool and associated spool re-wind spring on which a length of seat belt material is wound. Although a pawl and ratchet mechanism and inertial locking mechanism is also typically included in such retractor mechanisms, in accordance with the present invention such pawl and inertial locking mechanisms for locking a seat belt in extended, body-entrained position are eliminated from retractors 482 and 528. The retractor mechanism, minus such parts, is received in a molded plastic outer housing 530. Both the housing and the retractor frame have outwardly protruding mounting tabs 532 and 534 (FIG. 10) which lap together with registering holes for receiving the associated mounting fastener 496, 524.

In accordance with another feature of the present invention and as best seen in FIG. 10, the mounting recesses 484 and 522 of pallet 120 are made deep enough so that the associated retractors 480 and 526 do not protrude above the plane of top deck surface 136. In addition, pallet recesses 484 and 522 are located adjacent and outboard of their respectively associated compartments 172 and 174 and are oriented laterally of pallet 120 so as to align generally with the fore and aft midpoint of the seat loads. Hence the seat latching belts 482 and 528 when extended and releasably coupled as shown in FIG. 1 are generally centered fore and aft over the seat bottoms 536 and 538 of seats 102 and 104, as generally indicated in FIGS. 18–21.

In accordance with a further feature of the invention, belt 528 of retractor latch mechanism 526/528 is made of standard commercially available seat belt webbing material such as woven nylon or polyester, identical to that used in conventional seat belt passenger retaining automotive systems. Belt 528 is made to a predetermined length, and longer than belt 42. For example, belt 528 may have a length so as to extend, when fully unwound from housing 530, about 38 inches, versus a length of approximately 34 inches similarly measured for belt 482 when these belts are adapted for securing the variety of seat loads described previously for installation in mini-van 100.

As best seen in FIGS. 17 and 23, the free end of belt 528 is permanently secured to a specially designed buckle 540 provided in accordance with the invention. Buckle 540 preferably comprises a thin flat member which may be readily stamped or die-cut from flat plastic sheet material, such as ABS, to have a finger-pull opening 542 and a belt-loop opening 544. In one working embodiment, body portion 546 of buckle 540 has a dimension transverse to the longitudinal axis of belt 528 of 3⅞ inches, whereas the like dimension of the tongue portion 548 of buckle 540 is 2¹¹⁄₁₆ inches. The dimension of buckle 540 parallel to the belt axis is about 2⅛ inches. The dimension of the loop opening 544 is generally the same as the standard belt webbing width, namely 2 inches, whereas the lengthwise dimension of opening 542 is made approximately 3¼ inches. The thickness of buckle 540 is approximately ⅛ inch.

A notch 550 is provided toward the free end of buckle 540 to facilitate finger entry and gripping of buckle 540. As best seen in FIG. 17, the belt 528 is permanently fastened to buckle 540 by feeding the free end edge 552 of belt 520 upwardly through buckle opening 544 and then back over the subjacent belt run 554 and permanently affixed thereto by a sonic weld formed fused seam 556.

In accordance with still another feature of the invention, belt 482 of the belt latch subassembly 480/482 is constructed of flexible hook-and-loop releasable fastening material, such as that sold commercially by Aplix, Inc. of South Carolina, Style Numbers FW 50L008G-0787 (loop) and FW 50H008-0229 (hook). Belt 482 consists of two strips of this material joined end to end, namely a main run 560 of loop material and a free-end run 562 of hook material. The loops 564 and hooks 566 of strips 560 and 562 are both oriented facing upwardly. These two strips are permanently joined end to end by a lap seam joint 568 (FIGS. 16, 24 and 25) made by overlapping strip 562 about ¼ inch over the free end of strip 560 and then applying pressure and generating a welding heat with sonic welder to fuse the materials together permanently. The opposite end of loop run 560 is suitably secured to the spindle of the retractor spool in retractor 480.

Belt 482 is provided with a specially constructed pull tab 570, shown separately by itself in FIG. 22 which is stamped or cut from the same material as buckle 540. Tab 570 is generally rectangular in plan view and is provided with round corners 572 and 574 at its leading edge. In one working example the dimension of tab 570 transverse to the belt axis is 3 inches and the dimension parallel to the belt axis is 1⅝ inches. The web receiving opening 576 is provided in tab 570 approximately ⅜ of an inch forwardly of the tab from the rear edge 578 of the tab. The lengthwise dimension of opening 576 is generally the same as that of the strip material of belt 42, namely approximately 2 inches.

Belt 482 is permanently affixed to tab 570 by feeding the free end 580 of strip 562 upwardly through tab opening 576, then overlapping the same with the main run of hook material of strip 562 and then forming a permanent joint 582 therebetween with pressure sonic welding across the entire width of the strip. The width of joint 582 is typically ¼ inch and hence can be formed by the same sonic welding fixture employed in forming joint 568 and joint 556 of belt 528. With belt 482 permanently attached to the retractor spool of retractor 480, and fully extended as unwound therefrom, the lengthwise dimension of strip 560 is preferably about 26½ inches, and the length of the exposed hook portion of strip 562 is about 6 inches.

Assembly of Belt Latching Mechanism on Pallet 120

In the embodiment of pallet 120 as described hereinabove to provide a pallet vehicle seat shipping package in accordance with the invention for supplying the aforementioned seats 102–112 for the mini-van 100, the belt and retractor mechanism subassemblies 480/482 and 526/528 are preferably pallet end-mounted closely adjacent the outboard sides of the respectively associated driver seat compartment 172 and passenger seat compartment 174, with tab of 570 of belt 482 and buckle 540 of belt 528 facing oppositely and away from the seat compartments (FIG. 5). The retractor mechanisms are also oriented such that the buckle 540 and tab 570 are retracted flush with the adjacent side surfaces of the pallet ends.

It also is to be noted that the pallet 120 as configured in plan outline has large notches 600 and 602 in its longitudinally opposite ends and similarly shaded notches 604 and 606 (FIG. 5) at the center of the longitudinal sides of the pallets to accommodate conventional automated conveyor "see-saw" plate pallet stop mechanisms (not shown).

A bar code label holder 610 is preferably provided in set in the longitudinal side surface of pallet 120 adjacent the rear of seat compartment 172 so that pallet 110 and its given seat load can be readily and automatically identified by the automated handling and control equipment at both the seat assembly plant and the vehicle assembly plant.

Operation of Pallet Latching System

FIGS. 2, 5 and 11–15 illustrate pallet 120 in empty, unloaded condition to better show the operation of the belt latch system of the pallet. FIGS. 2 and 5 show latch belts 482 and 528 and associated operating handle tab 570 and handle buckle 540 in their fully retracted position. In this belt latch retracted position, tab 570 and buckle 540 are held releasably locked in their horizontally protruding positions by the retracting force exerted by the associated retractor rewind springs via the associated belt rims spool-wound in the retractor housings. Hence the built-in belt latching system is entirely recessed in retracted position below the elevation of the main surface 136 of too deck 130, and inwardly of the longitudinally opposed pallet end surfaces, and hence, the latch hinge system does not interfere with the aforementioned stacking of pallets 120 one on top of another.

Figure 12:
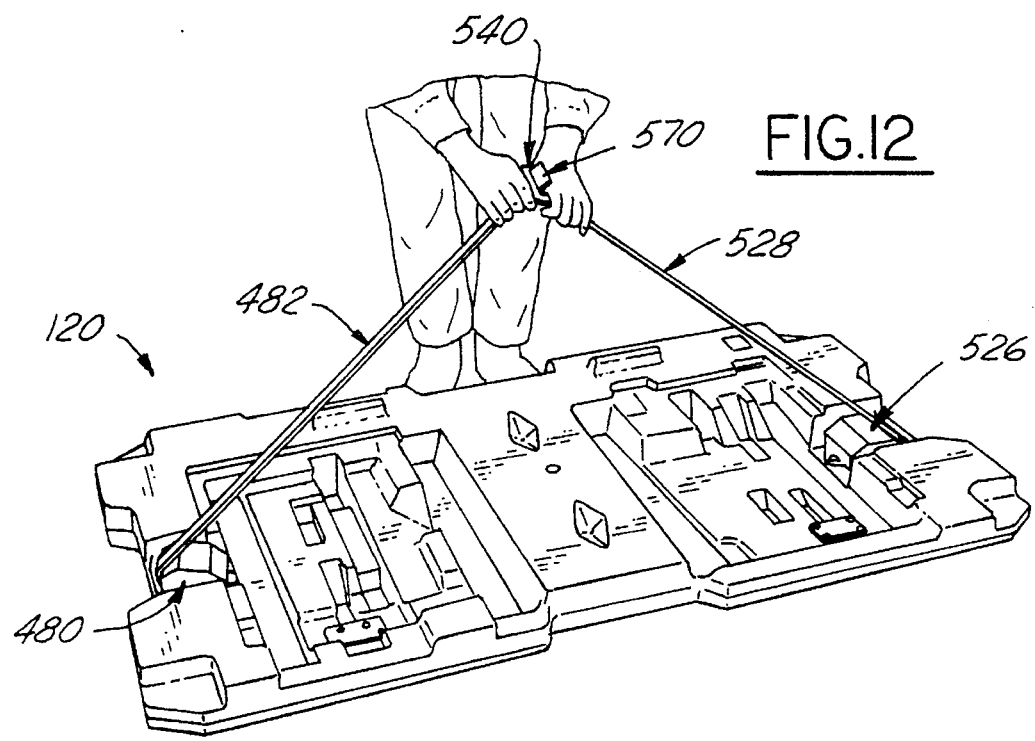
Figure 13:
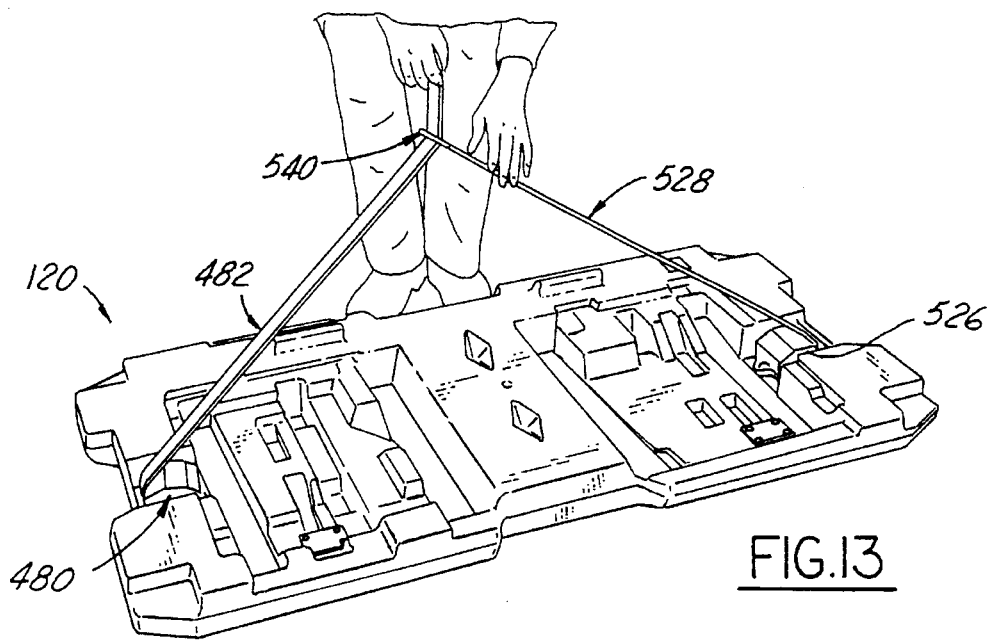
Figure 14:
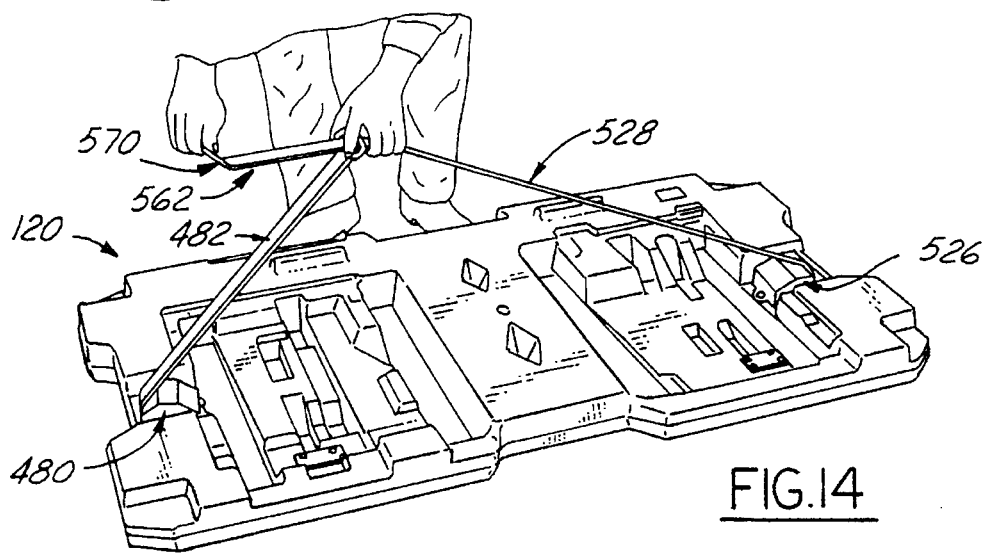

To operate the pallet belt latching system to seat-load-engaging mode, the operator may grip buckle 540 with the fingers of one hand and pulls out belt 528 from retractor 526 against the force of its internal spool rewind spring. While holding buckle 540 with belt 528 as so extended, the operator grips tab 570 with the other hand to pull out belt 482 from retractor 480 against the force of its rewind spring. Then as illustrated sequentially in FIGS. 11–15, the operator interengages the belts by inserting tab 570 through the loop opening 542 of buckle 540 (FIG. 12). Then while holding tab 570 the operator can release his grip on belt 528 (FIG. 13), and then pull tab 570 in the direction back toward retractor 480. This produces a cinching action and 2:1 "block and tackle" mechanical advantage on belt 528 which insures that belt 528 is fully extended from its retractor 526 during this action. Belt 482 will likewise be fully extended from its retractor 480 during this procedure.

Figure 15:
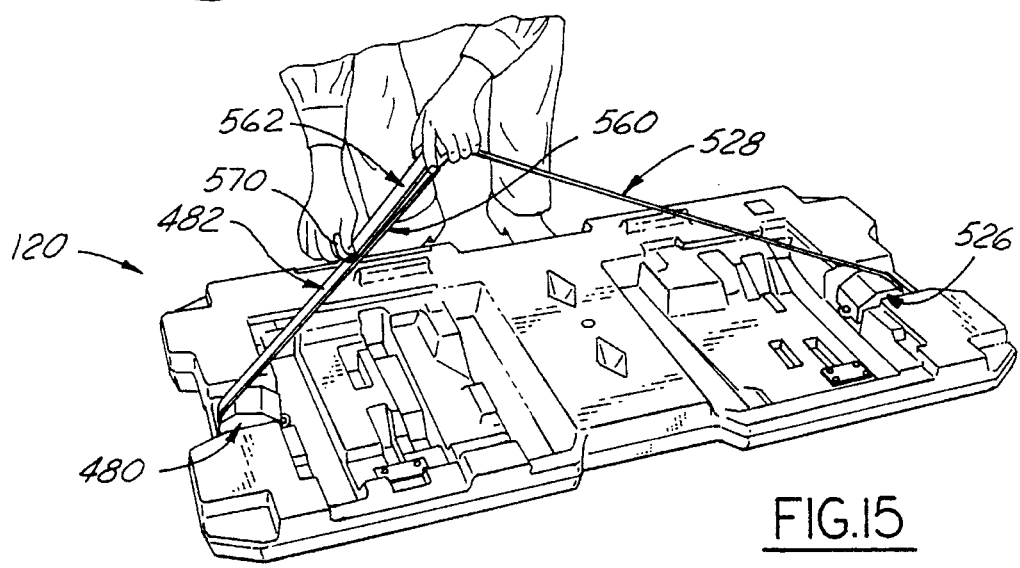

Then the belt latching system is releasably locked by merely bringing the hook material 566 of strip 562 down against the upwardly mutually facing loop material 564 of strip 560, as shown in FIG. 15. The overall length of the latching belts 482 and 528 when so coupled is adjustable by first pulling strip 562 varying distances from buckle 540 before placing it against strip 560, it being understood that strip 552 may be hook-and-loop releasably attached to strip 560 anywhere along its exposed length running back to retractor 480. This adjustment feature thus accommodates the variations in the seat load girth measurements encountered when switching from a pallet load of two single seats such as shown in FIG. 1, to a single seat load of either the mid-row bench seat 106 or the rear seat bench seat 108.

To operate the pallet belt latching system from seat-load-locking to seat-load-unlocked condition tab 570 is merely gripped with the fingers of one hand and pulled upwardly and away from the underlying strip 564 with a "tearing" action to thereby progressively disengage the hooks 566 of strip 562 from the loops 564 of the underlying strip 560. The force of the rewind springs of each retractor 480 and 526 will then draw strip 562 back through the buckle 540 until tab 570 clears the buckle. When belts 482 and 528 are so disengaged and free of one another, they can be released by the operator and will be automatically rewound to fully retracted position in their respective retractor housings, thereby restoring the fully retracted condition shown in FIGS. 2 and 5.

Loading and Locking Seats on Pallet 120
Loading of Front Row Passenger Seat 104 and Driver Seat 102

The construction of the seat supporting undercarriage framework of front row passenger-side seat 104 is partially seen in the view of FIG. 1. It will be seen that seat 104 has laterally spaced apart "outboard" and "inboard" (the terms "inboard" and "outboard" being used with reference to their orientation on the seat in the van in use) underframe side walls 620 and 622 respectively, each made as a sheet metal stamping and having an in-turned peripheral flange formed at fore and aft spaced locations along its lower edge to provide outboard and inboard front seat foot portions 624 and 626 respectively, and corresponding rear seat foot portions (not shown).

To load seat 104 on pallet 120, seat 104 is manually lifted, while in body position, over the pallet to orient the underframe side walls 620 and 622 vertically above the associated seat foot supporting structure 312–314 and 316–318 of the passenger-side compartment 174 of deck 130. The latching system is in the retracted and spring-locked condition and position of FIGS. 2 and 5, as described previously. Then, as shown in FIG. 1, all four foot portions of seat 104 are lowered downwardly toward deck 130 to register and nest the seat frame side walls in the associated nesting recesses of compartment 174. The front flange foot portions 624 and 626 of seat 104 rest on the pallet seating platforms 312 and 310 respectively and the rear outboard and inboard foot portions likewise respectively rest on pallet pocket seats 314 and 316.

When seat 104 is so drop-mounted on top deck 130 in nested relation in passenger-side compartment 174 of pallet 120, seat 104 is securely supported and gravitationally held against movement laterally and longitudinally of pallet 120 when the pallet is oriented with deck surface 136 generally horizontal and even when tilted slightly from horizontal.

Driver seat 102 is likewise nest-loaded on the driver-side compartment 172 of pallet 120 so as to be positioned in the loaded and latched position seen in FIG. 1. The latch locking procedure for seats 102 and 104 is shown in sequence in FIGS. 16–21, and the latched and locked condition of seats 102 and 104 on pallet 120 is shown in FIG. 1.

Driver seat 102 may be dropped mounted onto pallet 120 following the same sequence and procedure described previously with respect to passenger seat 104, but with driver seat 102 properly vertically aligned over its associated driver-side mounting compartment 172 of top deck 130. Seat 102 is thus lowered onto deck 130 into fully seated registry therewith to seat the outboard and inboard front foot flange portions respectively upon the compartment pocket seating surfaces 194 and 196 of deck 130, and the outboard and inboard rear foot flange portions respectively on pocket seats 200 and 198. Seat 102 thus has a four-foot engagement with deck 130 of pallet 120, like passenger-side seat 104, and is likewise thus securely gravitationally held by the driver-side compartment nesting against movement laterally and longitudinally of pallet 120 with the pallet oriented generally horizontally.

Belt Latch Locking of Passenger-Side and Driver-Side Front Seats on Pallet

Next, and referring to FIGS. 16–21 in sequence, the belt latch system is operated in the manner described in conjunction with FIGS. 11–15 to extend the seat latching belts 482 and 528 from retracted to fully extended and then latch-lock extended position. This will cause belts 482 and 528 to span across upon seat bottoms 536 and 538 generally centrally thereof and approximately midway between the front and rear feet of each seat.

It will be further noted that, once so latched by belts 482 and 528 to pallet 120, seats 102 and 104 are restrained against upward vertical movement relative to deck 130 solely by the belts. If forces are exerted on seats 102 and/or 104 tending to tilt the same forwardly or rearwardly of pallet 120, the same restraining action is provided by the latched belts, and likewise as to forces tending to tilt seats 102 and/or 104 sideways either clockwise or counterclockwise as viewed in FIG. 1.

It will thus be seen that with front seats 102 and 104 so mounted upon and belt-latched to pallet 120, the same are securely retained in all directions against movement relative to pallet 120. Hence seats 102 and 104 are held on pallet 120 in a manner to withstand severe tilting of pallet 120 during truck or rail transport and also while moving on severely inclined automated conveyor systems, as well as the jolts and shocks of rough handling often encountered in normal handling of loaded pallets. When pallet 120 with seat 104 so loaded thereon is delivered to the vehicle assembly line station, the same is easily and rapidly removable from pallet 120 by reversing the sequence of the foregoing latching and loading procedure.

Mounting and Latching of Third Row Bench Seat on Pallet

Third row bench seat 108 has a conventional undercarriage including laterally spaced passenger-side and driver-side support frame subassemblies. The conventional front feet of seat 108, like feet 107 of mid-row bench seat 106 (FIG. 9) and those of mid-row latch seats 110 and 112, comprise C-shaped claw brackets having a forwardly opening central slot for receiving the associated van seat-mount rods which are recess mounted into the floor of the passenger compartment of the van (not shown). The two conventional rear feet of seat 108, like rear feet 109 of seat 106 (FIG. 9) and those of seats 110 and 112, comprise releasable latch claw mechanisms of identical construction. Each such rear foot latch mechanism has an operating handle for pivoting a claw between a closed position for trapping an associated van floor rod and an open position for disengaging the rear foot from the floor rod. When the rear claws are so released seat 108 may be tilted forwardly to lift the rear of the seat, and then the seat is pulled back to release front claws from their associated floor rods. Seat 108 is releasably mounted in the van by performing this reverse sequence in reverse.

Bench seat 108 is drop mounted onto pallet 120 by first aligning seat 108 vertically above the pallet with passenger-side and driver-side front feet positioned above deck 130 and generally aligned to rest on pallet pocket seats 230 and 370 and with the passenger-side and driver-side rear feet above pallet seats 232 and 372. Seat 108 is then lowered to rest all four feet on the aforementioned deck seats, the rear foot claws remaining spring biased into closed condition so that the rear of the seat rests on the bottom surface of each of these closed claws. Seat 108 is then slid forwardly on the pallet so that the front feet claws engage plates 234 and 374. Seat 108 when so drop-mounted and engaged with pallet 120 is nested within the pallet pocket recesses 230/232 and 370/372 and thereby gravitationally held against movement laterally and longitudinally relative to the pallet with the pallet oriented generally horizontal. Plates 234 and 374 also prevent rearward tipping of seat 108 relative to the pallet to thereby assist in counteracting the rearward tilting forces imposed by the upright back cushion of this seat.

Bench seat 108 is then belt-latched-locked to pallet 120 following the sequential belt latching procedure for this seat as described previously for seats 102 and 104 and as shown in FIGS. 11–21, which is the same latching pallet tie-down procedure used for all seats.

As so belt latched and nestably locked on pallet 120 in "body position" (back locked up), seat 108 is snugly restrained by belts 482 and 528 against movement upwardly on the pallet. Hence, all of the seat feet are now fully trapped in nested engagement with the aforementioned pallet compartment recesses to thereby restrain seat 108 against forces tending to lift the same upwardly and/or tilt it backwardly, forwardly or sideways relative to pallet 120. Thus, when so mounted and belt latch/locked to pallet 120, bench seat 108 is securely retained thereon against movement relative to pallet in all directions. Hence as so loaded, pallet 120 can be transported, handled and conveyed through severe tilting and inclined motions encountered on automatic conveyor system and in handling by other pallet transport equipment without danger of bench seat 108 becoming loose from pallet 120.

Seat 108 is readily unloaded at the vehicle assembly line station in the same manner as all the remaining seats discussed herein, namely, by reversing the belt latching procedure, namely, to first release the seat belts, then allowing the latch belts to be spring rewound to retracted position, and then removing the seat from pallet 120, seat now being free to be lifted completely off of pallet 120.

Pallet Mounting and Belt Latching of Mid-Row Bench Seat 106

Mid-row bench seat 106 has an undercarriage construction identical to seat 108. Hence, when drop mounting bench seat 106 on pallet 120 the driver-side seat frame is aligned with the pallet in the same manner as driver-side frame of seat 108 to thereby rest its front and rear feet nestably in and on front and rear pallet pocket seats 370 and 372 respectively. Likewise, the passenger-side underframe 930 is aligned vertically with and seats nestably on drive compartment deck pocket seats 230 and 232.

Thus when so mounted, mid-row bench seat 106 has the protruding edge of plate 374 registered within the open slot of its driver-side front foot claw 107 (FIG. 9). Likewise, the passenger-side frame has its front foot claw positioned to register its open claw slot with the protruding edge of plate 234. The rear feet have their closed claws resting on seats 372 and 232. Thus, when the belt latching system is moved from released to belt latch/locked position spanning the seat bottom of bench seat 106 (with the seat in body position and with its back locked upright), seat 106 is thereby secured in fully locked condition on pallet 120.

The mid-row bench seat 106 is thus held against movement in all directions relative to pallet 120 by its seated nesting engagement in the pallet seats and the mid-point tie-down restraint of belts 482 and 528. Hence, although the seat-to-pallet load differs slightly as between these bench seats, their mounting and demounting procedure relative to pallet 120 is the same.

Pallet Mounting and Belt Latching of Driver-Side and Passenger-Side Mid-Row Bucket Seats 110 and 112

Since the driver-side and passenger-side mid-row bucket seats 110 and 112 are also user-removable seats, the same each have centrally located claw-type van-floor-mounting assemblies identical in construction to the seat underframe claws of bench seats 106 and 108. However, the inboard and outboard side underframes of these mid-row bucket seats are laterally spaced apart by a much shorter distance than those of the bench seats, and with a lateral spacing unique to each of these seats. Hence, in drop-mounting seat 110 on pallet 120 the same is vertically aligned over the driver-side compartment 172 of deck 130 with the central front claw over pallet pocket seat 222 and with its central rear claw aligned with pallet pocket seat 220. The outboard front and rear flat feet of seat 110 are aligned with deck pocket seats 223 and 224, and the inboard front and rear flat feet of seat 110 are aligned with deck pocket seat 225 and 226. Seat 110 is then lowered onto pallet 120 similar to the procedure with seats 102, and when fully nested on the pallet is now positioned for belt latching and locking onto pallet 120.

When the belt latch system is moved from retracted to latched and locked condition as described previously to span the seat bottoms of both pallet-mounted seats 110 and 112, seat 110 is thereby securely nested and locked against movement in any direction relative to pallet 120 for transport of the pallet so loaded through various tilting and inclined orientations normally encountered in service, as described previously. Again, unlatching and unloading of seat 110 from pallet 120 is performed by following the same procedure as that performed with all of the other user-releasable type seats 106, 108 and 112 provided for van 100.

Passenger-side mid-row bucket seat 112 likewise has inboard and outboard seat underframe flat foot support assemblies respectively constructed identically to the corresponding supports of seat 110. However, the lateral spacing of its underframe side is unique to seat 112, the same being even more closely laterally spaced apart than those of seat 110. Hence, the passenger-side compartment 174 of deck 130 provides a front pocket seat 342 and ledge 346 and rear pocket seats 344 and 348 spaced to uniquely to accommodate the four flat feet of van seat 112 on the passenger-side of pallet 120. When the four feet of van seat 112 are oriented above these corresponding pallet seats, seat 112 is drop-mounted in the manner of seat 110. This causes the floor-engaging claws of sat 112 to protrude into the nesting pockets 338 and 340.

Hence when the belt latching system is shifted from release/retracted to latched/locked condition as described previously, seat 112 is likewise nested and belt latched against movement in all directions relative to pallet 120. Again, unlatching and demounting of seat 112 from pallet 120 is performed identically to that of the other user-removable van seats 106, 108 and 110.

Although not shown, the mid-row removable child safety seats, if provided for van 100 for user-removable driver-side and passenger-side van mounting respectively, have undercarriages constructed identical to those of seats 110 and 112 respectively, and hence are mounted, latched, unlatched and demounted from pallet 120 in the same manner as seats 110 and 112.

Second Embodiment of Pallet/Vehicle Seats Shipping Package

Referring to FIG. 26, a second embodiment of a combined pallet/vehicle seat shipping package 700, also provided in accordance with the principles of the present invention, is illustrated semi-diagrammatically as adapted for transport from the seat assembly plant to the vehicle assembly plant of the complete array of seating components for the Ford Motor Company CDW27 Model passenger vehicle (intended as the 1996 model year replacement for the current Ford Motor Company Tempo and Topaz vehicles). Package 700 thus includes a driver-side seat 702 made up of a seat back 704 and a seat bottom 706; a passenger-side seat 708 made up of a seat back 710 and seat bottom 712; a rear seat bottom cushion 714; and a rear seat back cushion 716. Shipping package 700 also includes a shipping pallet 720 constructed generally in the manner of pallet 120 as a twin sheet thermoformed hollow clamp shell platform made of high density polyethylene with upper and lower decks. Stacking lugs 722, 724 and 726 protrude upwardly from the upper deck and corresponding cooperative stacking nesting cavities are formed in the bottom deck (not shown). Pallet 720 is likewise provided with nesting compartments (not shown) in its upper deck for snugly and securely nestably receiving the underframes of seat bottoms 706 and 712 in a manner similar to pallet 120. Seats 702 and 708 are thus individually drop mounted on pallet 720 into the nesting compartments in the upright "body position" as shown. These two front bucket seats are thus restrained against movement laterally and longitudinally of pallet 720 when the same is oriented generally horizontally by gravitational forces cooperating with the nested reception of seats bottoms 706 and 712 on the upper deck of pallet 720.

In the aforementioned compact passenger vehicle CDW27 Model, the vehicle body is provided with platforms built in to the body to provide the frame work for the rear passenger seats. Hence for rear seat assembly the vehicle assembly plant need only be provided with rear seat cushions 714 and 716 to complete the rear seat assembly in the vehicle. Thus in accordance with a further feature of the invention, shipping package 700 provides in one cargo load all of the seat components to complete the seat assembly at the vehicle assembly plant. This is accomplished by stacking rear seat bottom cushion 714 upright with its forward edge straddling front seat bottoms 706 and 712 adjacent front seat backs 704 and 710 and with the bottom surface of the rear bottom seat cushion 714 laying against the front surfaces of the front seat backs 704 and 710. The rear seat back cushion 716 likewise is oriented with its bottom edge straddling front seat bottoms 706 and 712 in an upright, tilted orientation with its rear surface propped against the upper seat surface of cushion 714. This entire seating component array is then securely tied down onto pallet 720 utilizing only the single belt latching system of the invention as illustrated in FIG. 26. Those components of this belt latching system alike in structure and function to those of the system described previously in conjunction with FIGS. 1–25 are given like reference numerals raised by a prime suffix and their detailed description not repeated.

Thus, in accordance with a further feature of the invention, this second embodiment shipping package 700 requires only the two belt/retractor subassemblies 480'/482' and 526'/528' of a single belt latching system to complete the tie-down securement of the entire seating component array on pallet 720. For this purpose pallet 720 is provided on its upper deck with nesting pockets 730 and 732 located laterally opposite one another adjacent but instead from the longitudinal side edges of the pallet. Pockets 730 and 732 are aligned laterally of the pallet and centered longitudinally of the pallet between the nesting compartments for seat bottoms 706 and 712. Retractor 480' is permanently fastener mounted in pocket 730 in the manner similar to retractor 480 on pallet 120, but rotated 180° therefrom so that the associated belt 482' feeds out from the retractor from the inner end of pocket 730. Likewise, retractor 526' is permanently fastener mounted in pocket 732 with its associated belt 528' feeding from the retractor adjacent the inner end of pocket 732.

In the operation of the belt latching system of shipping package 700, belts 728' and 542' are respectively individually withdrawn from their associated retractors 526' and 480' by manually gripping their associated buckles 540' and 570' and pulling the belts separately upwardly from each of the retractors. The buckle end of belt 528' is fed upwardly behind cushion 714 in the space between seat backs 704 and 710, then trained over the top (rear) edge of cushion 714 and then led down to receive tab 570' of belt 542' through buckle 540' in the manner described previously. The hook material strip 562' of belt 482' is drawn down to cinch the interengaged belts tightly so that the downwardly extending run of belt 520' is snugged tightly over the upper edge of cushion 716. Then the belt system is releasably secured in load tie-down condition by pressing strip 562' against the loop strip 560' of belt 482' to thereby belt-latch the seat load components in a snug and secure assembled shipping package array as shown in FIG. 26. The tension force exerted by the latched belts on seat cushion 714 is transmitted therethrough onto seat bottoms 706 and 712, and also forces seat cushion 716 back against cushion 714. It has been found by so loading cushions 714 and 716 as stacked on top of seats 702 and 708, these front passenger seats are securely held down on pallet 720 for transport in a secure and reliable manner even though seats 702 and 708 are not directly engaged by the belt latching components.

Preferably pallet 720 is also provided with destacking recesses 734, 736, 738 and 740 at each of the four corners of its upper deck to facilitate unstacking of a stacked array of empty pallets. Pallet 720 is also provided with beveled corners 742, 744, 746 and 748 at each of its four corners, similar to pallet 120, to provide lead-in surfaces to facilitate conveyance of the loaded pallet on automatic conveyor systems.

Advantages

From the foregoing it will now be understood that the exemplary but preferred embodiments of pallet 120 and 720 and the shipping packages with seating components securely but removably mounted on these pallets, as constructed in accordance with the invention amply fulfills the aforestated objects and provides numerous advantages for transport shipment movement on live-roll automated conveyors and storage of both loaded and empty pallets, particularly in handling of automotive passenger seats between the seat manufacturing facility and the automotive vehicle assembly line. It will now be seen that one and the same pallet 120 can readily accommodate a wide variety of seat load configurations. Moreover, each of these different seat loads is belt latched and locked onto pallet 120 utilizing only one latching system and one latching procedure. This feature greatly contributes to achievement of significant cost savings in both pallet manufacture and use.

The twin sheet thermoplastic construction of pallets 120 and 720 provides a strong and durable low aspect ratio load supporting structure of economical manufacture having a high strength-to-weight ratio. The automotive seat loads, although bulky, heavy and having a high-aspect ratio, are nevertheless safely carried on pallets 120 and 720 in a secure and stable manner since they are pallet nested and belt locked down at their strongest areas as designed for ultimate end-use in the vehicle, namely, on their support feet. They are thus also oriented on pallets 120 and 720 in the same manner intended for end-use, namely, "body position", thereby further reducing likelihood of cargo seat damage during palletized shipment and storage, as well as during pallet loading and unloading of the seating components.

Pallets 120 and 720 are capable of reliable operation over an extended service life, but when eventually damaged by severe usage as to be no longer be of useful service, the same can be economically recycled by recycling machinery which pulverizes the twin sheet plastic material and in this process removes all of the metal fixtures mounted on the pallet. Most often many of the more rugged metal fixture components of pallets 120 and 720, and particularly the belt/retractor subassemblies, can be salvaged for re-use. This recycling debris can be readily separated to segregate the plastic material from the metal components, the metal fixture debris being either recyclable for re-use as is or in conventional scrap metal recovery processes if scrapped, and the thermoplastic material being thus made available for regrinding and reuse in forming starting plastic sheet material for manufacture of another pallet.

The large flat bearing area provided by the bottom surface 140 of pallet bottom deck 132 (and likewise of pallet 720) enables the pallet, whether empty or loaded, to move smoothly and easily over conveyor rolls and conveyor line gaps in automated pallet conveying and handling equipment. The smooth side and end surfaces defining the pallet periphery, and the absence of laterally or longitudinally pallet load protrusion of overhang, are further features also highly compatible for safe and reliable loaded or empty pallet conveyance through such equipment. Pallets 120 and 720, being flat and rectangular in overall configuration, and having a very low aspect ratio when empty, are readily stackable in a nested, compact and secure storage array, thereby further reducing storage and return shipment costs as well as likelihood of damage to the empty pallets.

The bar code labels removably attached to the label plate holders 610 and 610' enable the pallet to be automatically selected, sorted and conveyed on automatic conveyor equipment with each pallet separately identified, and the load type thereon likewise being identifiable and selectable for automatic conveyor delivery to the appropriate assembly line station. Moreover, metal (steel) bottom plates may be provided as optional adjuncts which enable ferromagnetic sensors in the conveyor system to further identify the location of the pallet on the conveyor for movement and positioning of the pallet as needed. Indeed, center plate 493 of pallet 120 is mounted in an underside recess with pop rivets solely for this conveyor sensor identification purpose.

The three dimensional nesting configuration and geometry provided in the seat mounting structure of the passenger and driver-side compartments of the top decks of pallets 120 and 720, in conjunction with the three dimensional upwardly embossed configuration of the associated pallet bottom deck with its aforementioned knit point bosses, cooperate to provide a high strength-to-weight ratio beam structural strength to pallets 120 and 720 thereby enabling them to securely and reliably support the heavy seat loads under adverse handling conditions. Hence only the two center oval knit points at 420/490 and 422/492 need be added to serve as the only two non-cargo load bearing knit points in pallet 120. The remaining knit points serve the dual function of stiffening the pallet and directly reinforcing the pallet seats for vehicle seat-foot loading thereon.

The location of the passenger and driver seats on pallet 120 as oriented thereon reversed from their in-use relationship in the van, and with their pallet locations clearly and permanently labeled with the molded-in legends "passenger" and "driver", greatly facilitates both proper loading of the pallets at the seat manufacturing facility and fast unloading of the pallets and correct reverse order assembly installation of the off-loaded front row and mid-row single passenger seats into the vehicle at the auto assembly plant, and likewise as to normal in-use orientation of the bench seats.

The vehicle seat carrying pallet of the invention has thus enabled the vehicle manufacture to enjoy substantial cost savings in vehicle manufacture while simultaneously improving the environmental aspects of automotive supplier cargo shipment.

It is also to be understood that, although the foregoing description and drawings describe and illustrate in detail various preferred embodiments of the present invention, to those skilled in the art to which the present invention relates the present disclosure will suggest many modifications and constructions as well as widely differing embodiments and applications without thereby departing from the spirit and scope of the invention. For example, the belt/retractor subassemblies can be mounted at varying selected locations in suitable mounting pockets arranged in the pallet upper deck in accordance with the geometry of different vehicle seating arrays and components. Also, a plurality of interengageable paired sets of retractor/belt subassemblies can be provided on a given pallet to accommodate unusual arrays of seating components without thereby departing from the aforementioned principles and features of the invention while retaining its numerous advantages.

The present invention, therefore, is intended to be limited only by the scope of the appended claims and the applicable prior art.

We claim:

1. A plastic pallet for supporting thereon in a free-standing manner a cargo load having a high aspect ratio and support feet constructed to support the cargo load in use in a free-standing end-use orientation, said pallet comprising:

a planar load bearing twin sheet hollow pallet member normally oriented with its major plane generally horizontal in use and being formed from upper and lower sheets of thermoplastic so as to have a low aspect ratio;

said pallet member comprising a top deck formed from said upper sheet of thermoplastic and having a generally upwardly facing cargo load supporting exterior surface;

said pallet member further comprising a bottom deck formed from said lower sheet of thermoplastic and having a generally downwardly facing pallet supporting surface;

a plurality of top deck and bottom deck bosses extending between said top and bottom deck surfaces respectively formed from said upper and lower sheets of thermoplastic and being fused together, said top deck bosses being distributed in a predetermined pattern to define at least one cargo load receiving and nesting compartment means recessed into said top deck, adapted for drop-on placement into said at least one compartment means of the cargo load from above said top deck, said top deck bosses being constructed and arranged to provide an array of cargo load bearing cargo foot seating surfaces and associated cooperative nesting surfaces in said at least one compartment means for restraining cargo load foot movement horizontally relative to said pallet member, and retractable seat belt latch means permanently attached to said pallet member and having cargo load hold down belt means operably movable relative to said at least one compartment means to an extended position spaced above said seating surfaces adapted for releasably engaging the cargo load as foot-supported on said seating surfaces with the cargo load pallet-positioned in its free-standing end-use orientation and with said hold down belt means disposed above the elevation of said seating surfaces and operable in said extended position for preventing vertical movement of the cargo load relative to said at least one compartment means with the cargo load so oriented, and being operably movable to a retracted cargo-load-disengaged position relative to and at least one compartment means clearing said seating surfaces and adapted to enable lift-off cargo load removal upwardly out of said at least one compartment means and drop-on loading of the cargo load on said seating surfaces with the cargo load pallet-positioned in its free-standing end-use orientation.

2. The pallet as set forth in claim 1 wherein said top deck bosses are distributed in said predetermined pattern to define a plurality of said compartment means arranged in a side-by-side row array lengthwise of said pallet and each adapted for individually receiving the aforesaid cargo load to thereby support a plurality of such cargo loads in a corresponding side-by-side free-standing array.

3. The pallet as set forth in claim 2 wherein said cargo load hold down belt means is operably adapted to simultaneously engage in the extended position thereof the plurality of the cargo loads when so received on said pallet member for holding all of the cargo loads against vertical movement relative to said pallet member, and being movable to said retracted position clearing all of said seating surfaces and adapted to simultaneously disengage the plurality of cargo loads.

4. The pallet as set forth in claim 1 wherein said hold-down belt means is operable to move horizontally and vertically of said pallet member between said extended and retracted positions thereof.

5. The pallet as set forth in claim 4 wherein said latch means comprises a belt retractor mechanism mounted on said pallet top deck adjacent said at least one compartment means and including spool rewind means rotatable for releasing and rewinding said hold-down belt means for movement between the extended and retracted positions of said hold-down belt means, and spring means for yieldably biasing said spool rewind means for rewinding said hold down belt means to the retracted position, said hold-down belt means comprising first and second belts movable in opposite directions relative to one another from and to said belt retractor mechanism to extended and retracted positions relative to said belt retractor mechanism to thereby provide the extended and retracted positions of said hold-down belt means said first belt having buckle means carried thereon outwardly of said belt retractor mechanism and oriented facing in the direction of movement of said first belt from retracted to extended positions, said buckle means in the retracted position of said hold-down belt means being disposed clear of said seating surfaces and being operable in the extended position of said first belt when said first belt is disposed above said seating surfaces for releasably coupling to said second belt, said belt retractor mechanism and said hold-down belt means being constructed, arranged and oriented for restraining vertical motion of the support feet of the cargo load when seated on said seating surfaces on said pallet member.

6. The pallet as set forth in claim 4 wherein said pallet includes static cargo load engaging fixture means permanently affixed to said pallet member in said at least one compartment means in non-movable relation to said pallet member, said fixture means being adapted to releasably engage the cargo load during drop-on loading movement of the cargo load onto said pallet and adapted to thereupon restrain horizontal movement of the cargo load relative to said pallet member.

7. The pallet as set forth in claim 5 wherein said pallet member is constructed and arranged to carry a cargo load in the form of front row automotive vehicle single passenger seats having laterally spaced apart undercarriage side support frames providing the support for each such seat, said at least one compartment means comprising a pair of generally rectangular major seat nesting recess compartments each constructed and arranged to have said cargo foot seating surfaces and associated cooperative nesting surfaces therein to each nestably individually receive therein a companion pair of the front row-vehicle passenger seats oriented for shipment on the pallet in their end-use orientation relative to one another, said hold-down belt means being oriented with a path of travel overlying each of said pair of compartments at an elevation above said cargo foot seating surfaces therein and operably adapted for pallet hold-down retention of each of the pair of the front row seats when mounted in its associated at least one compartment means to thereby restrain the seats against lift off movement vertically from said pallet in the extended position of said hold-down belt means.

8. The pallet as set forth in claim 7 wherein said top and bottom deck surfaces are generally flat in areas around the periphery thereof and disposed parallel with one another to thereby define flat stacking surfaces for stacking more than one of said pallet one upon the other with said bottom deck surface of one pallet juxtaposed flat against said top deck surface of a subjacent another said pallet, said hold-down belt means and said belt retractor mechanism being constructed and arranged between said flat stacking surfaces of said top and bottom deck surfaces in the retracted position of said hold-down belt means.

9. The pallet as set forth in claim 8 wherein said pallet member has a generally rectangular configuration in the plane of said flat stacking surfaces, said top and bottom decks each having a peripheral side wall, said side walls integrally joining said top and bottom decks and being fused together between said top and bottom decks around the periphery of said pallet, said top deck having a pair of nesting risers protruding above the major plane of said top deck stacking surface, said bottom deck of said pallet having a pair of nesting recesses formed upwardly into said bottom deck stacking surface and located in vertical alignment with said top deck risers and shaped to nestably individually receive an associated aligned one of said top deck risers of such subjacent another said pallet in stacked nested relation therewith.

10. The pallet as set forth in claim 9 wherein said top deck has pallet identifier indicia means removably carried thereon for identifying said pallet and the type of load carried on the pallet.

11. The pallet as set forth in claim 10 wherein said pallet member is constructed and arranged to also carry second row automotive vehicle user-removable passenger seats each having front and rear feet, each second row vehicle seat having undercarriage framework adapted for removable open claw slot mounting of its front feet with floor nested mounting rods of a van vehicle and having on its rear feet releasable floor rod engageable claw mechanisms, each of said at least one compartment means having front and rear mounting platforms formed therein said seating surfaces comprising first and second sets of four load bearing surfaces for individually receiving thereon the feet of a front row seat and a second row seat respectively, said second set of load bearing surfaces being arranged on said platforms laterally inwardly from and between said first set of load bearing surfaces and oriented for supporting an associated one of said second row vehicle seats, said mounting platforms each being adapted to nestably receive on said second set of load bearing surfaces thereof the four feet of the associated second row seat, each of said front mounting platforms having plates mounted permanently therein and oriented so as to be engageable by the open slot front claws of said second row vehicle seat when rested on said second set of load bearing surfaces and moved forwardly into engagement with said plates.

12. The pallet as set forth in claim 7 wherein said pallet member is further constructed and arranged to also carry a cargo load in the form of a pair of mid-row van single passenger bucket seats, a van mid-row bench seat and a van third row bench seat in alternate selected load relationships with the first row seats on said pallet member, the mid row and third row seats also each having the aforesaid support feet, said at least one compartment means including further cargo foot seating surfaces constructed and arranged to each nestably individually receive therein the support feet of said mid-row and third-row seats, said at least one compartment means being further constructed and arranged such that the bench seats each are alternatively supported on said pallet member as an individual seat load for said pallet and such that said mid-row bucket seats are supported and arranged in side-by-side relationship as a dual seat load on said pallet as alternative cargo load to the front row single passenger seats.

13. The pallet as set forth in claim 12 wherein each of the seats each have seat bottoms and seat backs and wherein said hold-down belt means are constructed and arranged to overlie, when in interengaged relation with the cargo load, the seat bottoms of said bench seats and to straddle the seat bottoms of a pair of the side by side mounted single passenger seats when such seats are selectively arranged as the aforementioned alternate loads to one another and positioned for shipment on the pallet in their free-standing end-use orientation.

14. The pallet set forth in claim 1 wherein said retractable seat belt latch means comprises first and second retractor mechanisms operable for wind-up storage of said hold-down belt means and being mounted on said pallet top deck separately from one another and spaced from one another thereon, and said hold-down belt means comprises first and second belts operably associated respectively with said first and second retractor means for rewinding therein to a retracted position and yieldably releasable unwinding therefrom to the extended position, said belts having intercoupling means releasably engageable with one another in the extended position of said belt means.

15. The pallet set forth in claim 14 wherein said first belt comprises a strip of conventional automotive seat belt webbing material having a free end remote from said first retractor mechanism and said belt intercoupling means includes a buckle attached to said first belt free end, and said second belt means comprises a first strip of flexible material attached at one end to said second retractor mechanism and having an opposite end extendable from said retractor mechanism and a second strip of flexible material attached at one end to said opposite end of said first strip of material and having a free end remote therefrom with a pull tab affixed thereto, said belt intercoupling means further comprising one of said second belt strips having loop material provided upon one surface thereof, the other of said second belt means strips having Velcro hook material provided on a surface thereof on the same side of said second belt as said loop material, whereby said tab of said second belt is insertable through said buckle of said first belt and then withdrawable with a cinching action in a direction away from said first belt to thereby interengage and snug said first and second belts relative to the cargo load, and belts being releasably secured in cargo load fastening relationship by engaging the mutually facing hook and loop materials of said strips with said one another.

16. The pallet set forth in claim 15 wherein said belts are formed of plastic material, said first and second strips of said second belt being joined to one another by a sonic welded lap joint, said free end of said first belt being trained through an opening of said buckle and lapped back upon itself and joined to the mutually adjacent portion of said first belt by a sonic welded lap joint, said tab of said second belt having an opening through which said second strip is fed and then lapped back upon itself and permanently affixed to the mutually lapped portion of said strip by a sonic welded lap joint.

17. A shipment package comprising in combination:

a free-standing cargo load comprising a manufactured product having a high aspect ratio and support feet constructed to support the product upright in end-use orientation;

and a planar load bearing twin sheet plastic hollow pallet member normally oriented with its major plane generally horizontal in use and being formed from upper and lower sheets of thermoplastic so as to have a low aspect ratio;

said pallet member comprising a top deck formed from said upper sheet of thermoplastic and having a generally upwardly facing product supporting exterior surface;

said pallet member further comprising a bottom deck formed from said lower sheet of thermoplastic and having a generally downwardly facing pallet supporting exterior surface;

a plurality of top deck bosses and bottom deck bosses extending between said top and bottom exterior deck surfaces respectively formed from said upper and lower sheets of thermoplastic and being fused together, said top deck bosses being distributed in a predetermined pattern to define at least one nesting compartment means recessed into said top deck adapted for drop-on placement into said at least one compartment means of the product from above said top deck, said top deck bosses being constructed and arranged to provide an array of load bearing product foot compartment seating surfaces and associated cooperative nesting surfaces in said at least one compartment means for restraining product foot movement horizontally relative to said pallet member, said product being partially received and nested in said at least one compartment means with the product support feet individually resting on said compartment seating surfaces with said product oriented upright on said pallet top deck and projecting upwardly therefrom in end-use orientation with said pallet oriented horizontally, and retractable seat belt latch means permanently attached to said pallet member and having product hold down belt means operably movable relative to said at least one compartment means to an extended position spaced above said compartment seating surfaces for releasably engaging said product as supported on its feet on said compartment seating surfaces with the product positioned in its free-standing end-use orientation and with said hold down belt means disposed above the elevation of said compartment seating surfaces and operable in said extended position for preventing vertical removal of said product relative to said at least one compartment means, said hold down belt means being operably movable to a retracted product disengaged position clearing said compartment seating surfaces and enabling lift-off product removal and drop-on loading of the product on said compartment seating surfaces with said product positioned in its free-standing end-use orientation.

18. The shipment package as set forth in claim 17 comprising more than one said manufactured product each of similar size and shape and wherein said top deck bosses are distributed in said predetermined pattern to define more than one of said compartment means arranged in a side-by-side row array in said pallet, said products being individually partially received and nested in said compartment means, said product hold down belt means being operable to simultaneously vertically restrain said products in the extended position thereof for holding all of said products against vertical lift off movement relative to said pallet member, said hold down belt means being movable to said retracted position and thereby clearing all of said compartment means seating surfaces and simultaneously freeing said plurality of said products from such vertical restraint.

19. The shipment package as set forth in claim 18 wherein said hold-down belt means is operable to move horizontally and vertically of said pallet between said extended and retracted positions thereof.

20. The shipment package as set forth in claim 17 wherein said pallet includes static product engaging fixture means permanently affixed to said pallet in said at least one compartment means in non-movable relation to said pallet, said fixture means being releasably engaged by said product during drop-on loading movement of said product onto said at least one compartment means and thereupon restrain horizontal and vertical movement of said product relative to said pallet.

21. The shipment package as set forth in claim 17 wherein said cargo load comprises more than one of said product in the form of front row driver and passenger seats of a vehicle end having a seat bottom and an upright back, and said cargo load further comprises vehicle rear seat bottom and back cushions stacked upright on the seat bottoms of said front row seats and leaning against the upright backs of said front row seats, and said retractable seat belt latch means includes retractor mechanism for releasably storing said hold-down belt means and being disposed centrally of said pallet member between said front row passenger seats, said retractor mechanism being constructed and arranged on said pallet member each that from said retractor mechanism said belt means is trainable over the stacked cushions on said front row passenger seats to releasably snug down thereon in latched relationship and to force said cushions downwardly and thereby exert downward restraining forces on said front row passenger seats to prevent vertical movement of said cargo load relative to said pallet member.

* * * * *